United States Patent
Clayton et al.

(10) Patent No.: US 11,222,305 B1
(45) Date of Patent: Jan. 11, 2022

(54) INSTRUMENTED ITEM HOOK SYSTEM

(71) Applicant: AMAZON TECHNOLOGIES, INC., Seattle, WA (US)

(72) Inventors: Eric Mathew Clayton, Seattle, WA (US); Vinod Lakhi Hingorani, Sammamish, WA (US); Benjamin Jozef Gyori, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 736 days.

(21) Appl. No.: 15/081,435

(22) Filed: Mar. 25, 2016

(51) Int. Cl.
*G06Q 10/08* (2012.01)

(52) U.S. Cl.
CPC .................. *G06Q 10/087* (2013.01)

(58) Field of Classification Search
USPC .......................................... 705/28; 211/85.29
See application file for complete search history.

(56) References Cited

U.S. PATENT DOCUMENTS

| | | |
|---|---|---|
| 7,225,980 B2 | 6/2007 | Ku et al. |
| 7,949,568 B2 | 5/2011 | Fano et al. |
| 8,009,864 B2 | 8/2011 | Linaker et al. |
| 8,189,855 B2 | 5/2012 | Opalach et al. |
| 8,630,924 B2 | 1/2014 | Groenevelt et al. |
| 9,235,928 B2 | 1/2016 | Medioni et al. |
| 2004/0011873 A1* | 1/2004 | Canipe .............. G06K 7/10881 235/462.13 |
| 2010/0169189 A1* | 7/2010 | Allison ................ G06Q 10/087 705/28 |
| 2011/0011936 A1 | 1/2011 | Morandi et al. |
| 2012/0284132 A1 | 11/2012 | Kim et al. |
| 2013/0284806 A1* | 10/2013 | Margalit ................ G06Q 30/06 235/382 |
| 2014/0110584 A1* | 4/2014 | Campbell ............ G06Q 10/087 250/340 |
| 2014/0216522 A1* | 8/2014 | Au .......................... F24S 25/70 136/246 |
| 2015/0086107 A1 | 3/2015 | Dedeoglu et al. |

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

(Continued)

*Primary Examiner* — Peter Ludwig
*Assistant Examiner* — Reva R Moore
(74) *Attorney, Agent, or Firm* — Lindauer Law, PLLC

(57) ABSTRACT

Items may be stored at an inventory location using an instrumented hook system. The instrumented hook system may include a hook from which items may be suspended. The hook may be affixed to a support arm using a weight sensor. The weight sensor provides weight data indicative of the weight of items suspended by the hook. The system may also include other sensors such as capacitive sensors, photodetectors, image sensors, and so forth. Sensor data from these sensors may be used to determine interaction data indicative of a quantity on hand, quantity picked, quantity placed, and so forth.

20 Claims, 10 Drawing Sheets

(56) References Cited

OTHER PUBLICATIONS

Kalnikaite, et al., "How to Nudge in Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lambent_devices_to_deliver_salient_information_in_supermarkets>.

Pop, Cristian, "Introduction to the BodyCom Technology", AN1391, DS01391A, Microchip Technology, Inc., May 2, 2011.

* cited by examiner

INSTRUMENTED ITEM HOOK SYSTEM

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity or movement of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
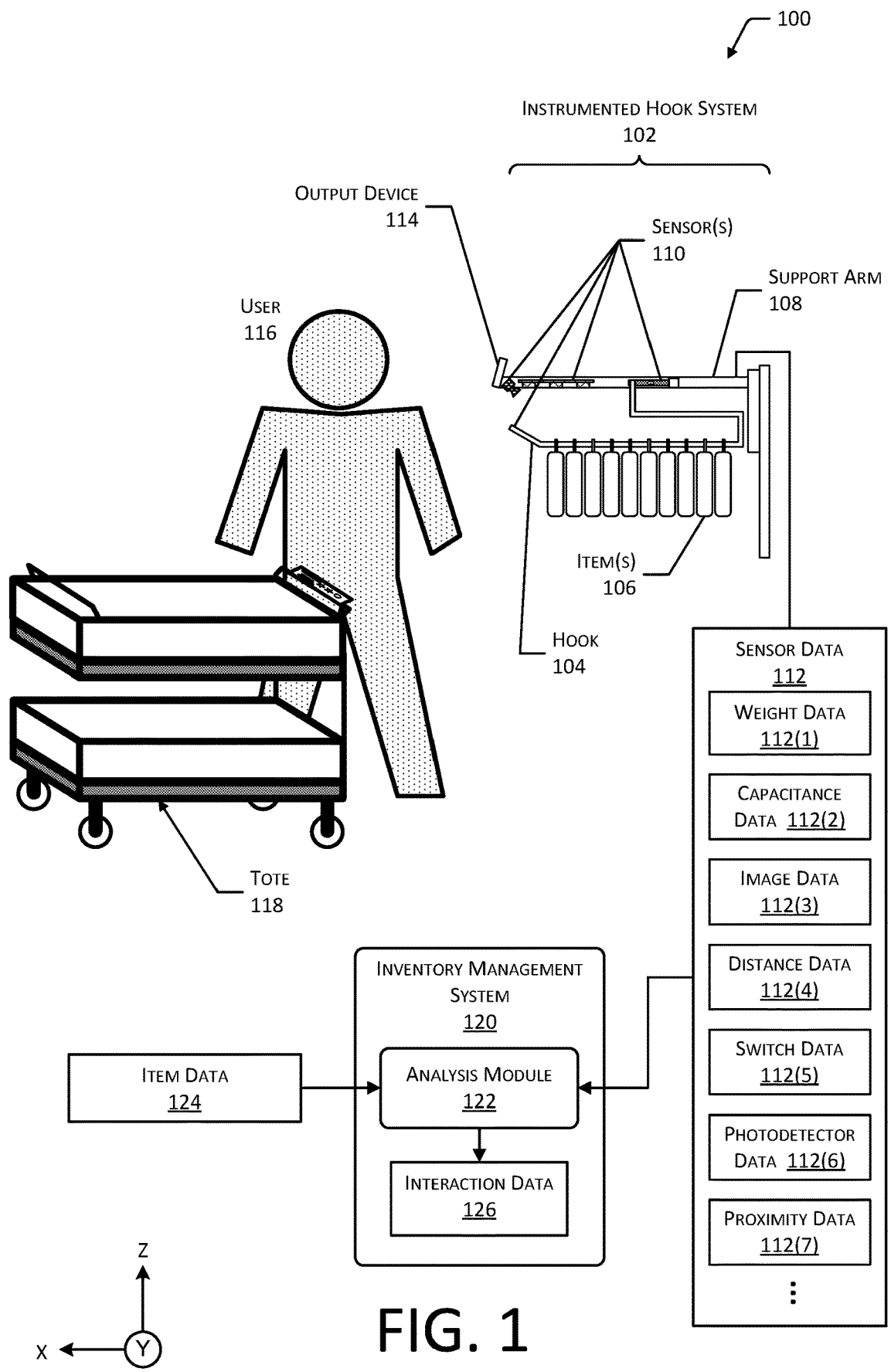
FIG. 1 illustrates a system including an instrumented hook system, which includes weight sensors and other sensors to provide sensor data that is used to generate interaction data about inventory, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to".

DETAILED DESCRIPTION

Described in this disclosure are systems and techniques for generating interaction data at an inventory location, such as in a materials handling facility (facility). The facility may include, or have access to, an inventory management system. The inventory management system may be configured to maintain information about items, users, condition of the facility, and so forth. For example, the inventory management system may maintain data indicative of a number of items at a particular inventory location, what items a particular user is ordered to pick, how many items have been picked or placed at the inventory location, requests for assistance, environmental status of the facility, and so forth.

Operation of the facility may be facilitated by using one or more sensors to acquire information about interactions in the facility. The inventory management system may process the sensor data from the one or more sensors to determine interaction data. The interaction data is indicative of action such as picking or placing an item at a particular inventory location, presence of the user at the inventory location, and so forth. For example, the inventory management system may use the sensor data to generate interaction data that indicates a type of item a user picked from a particular inventory location, quantity of the pick, and so forth.

An inventory location may include shelves, hooks, and so forth, that hold or otherwise support a type of item. Items may be added to (placed) or removed (picked) from the inventory location. In one implementation, the inventory location may comprise an instrumented hook system. Each hook may hold a different type of item and may include one or more sensors. The sensors may include weight sensors, capacitive sensors, image sensors, and so forth. The inventory management system may use the data from these sensors to determine the interaction data.

In one implementation, the instrumented hook system may include a support arm from which a hook is suspended. A weight sensor may be used to measure the weight of the hook and any items that are supported by the hook. The hook may be configured such that a center of mass of the hook when unloaded is directly below a hook suspension section from which the hook is suspended. With this arrangement, weight data that is obtained by the weight sensor is free from a lever arm effect and may be more accurate.

Other sensors may be mounted above the hook, such as on the support arm. The sensors may include capacitive sensors, time-of-flight sensors, image sensors, photodetectors, switches, and so forth. For example, a capacitive sensor may be used to detect the presence of a hand of the user as they add (place) or remove (pick) items from the hook. In another example, an optical time-of-flight sensor may be used to detect the motion or presence of the user's hand while placing or picking items from the hook.

In some implementations, a photodetector or image sensor may be used to detect an occlusion created by the user's hand, or an item as it moves near the hook. For example, a light source such as a light emitting diode may be mounted at the tip of the hook. A photodetector located on the sensor arm above the hook may be configured to detect light emitted from the light source to generate data indicative of intensity. If the intensity of the light detected by the photodetector drops below a threshold value, event data may be generated indicating some activity has taken place with respect to that hook. For example, event data may be generated based on removal of an item hanging on the hook that momentarily occludes the light emitted by the light source.

The event data may be used to trigger or initiate other actions. For example, event data may be produced from the capacitive sensor that indicates a change in capacitance values over time that exceeds a threshold value. Responsive to this event data, weight data may be accessed that was obtained from weight sensors at times corresponding to before and after a time associated with the event data. A change in weight based on the weight data from before and after the time of the event data may be used to determine a quantity of a type of item added to or removed from the inventory location.

By using the techniques described herein, operation of the facility may be improved. Details about interactions between users and items in the facility may be quickly and accurately determined. For example, as items are picked, placed, and so forth, information such as inventory levels based on changes in the count of items at the inventory locations may be readily and more accurately determined. As a result, the inventory management system may be able to quickly track what item a user has interacted with, maintain up-to-date inventory information, and so forth.

Illustrative System

FIG. 1 illustrates a system 100 to generate interaction data about inventory, according to some implementations. Inventory locations may be used to store items. These inventory locations may include, but are not limited to, hooks, shelves, racks, and so forth. Illustrated is an instrumented hook system 102. The instrumented hook system 102 includes one or more hooks 104. The hook 104 comprises a structure from which one or more items 106 may be suspended. For example, the hook 104 may comprise a wire, rod, tube, and so forth, made of any number of materials. Each hook 104 may be designated to store some quantity of a particular type of item 106. For example, a first hook 104(1) may be designated to stow pet treats while a second hook 104(2) may be designated to stow fish food. Hooks 104 may be mounted adjacent to one another, such as side-by-side, one above another, and so forth.

The hook 104 may be suspended from a support arm 108 that is positioned above the hook 104. In other implementations, the hook 104 may be sufficiently rigid and mounted to a support arm 108 or other structure that is below the items 106.

The support arm 108 may include one or more sensors 110. For example, the one or more sensors 110 may include weight sensors 110(1), capacitive sensors 110(2), image sensors 110(3) depth sensors 110(4), switches 110(5), photodetectors 110(8), proximity sensors 110(15), and so forth. One or more weight sensors 110(1) may be configured to determine the weight of a load supported by the hook 104. For example, the weight sensor 110(1) may comprise a single point load cell that has a first end affixed to the support arm 108 and a second end affixed to a hook suspension section of the hook 104.

The one or more sensors 110 may be configured to generate sensor data 112. For example, weight sensors 110(1) may generate weight data 112(1), capacitive sensors 110(2) may generate capacitance data 112(2), image sensors 110(3) may generate image data 112(3), depth sensors 110(4) may generate distance data 112(4), switches 110(5) may generate switch data 112(5), photodetectors 110(8) may generate photodetector data 112(6), proximity sensors 110 (15) may generate proximity data 112(7), and so forth. Other configurations of the hook 104, sensors 110, and so forth, are discussed below.

The switches 110(5) may include microswitches, pressure switches, momentary switches, and so forth. For example, the switch 110(5) may comprise a D2F model switch with a pin plunger as offered by Omron Corporation of Japan.

In some implementations, the instrumented hook system 102 may include one or more output devices 114. The output devices 114 are configured to generate output such as displaying colors, text, graphics, icons, sounds, haptic output, scents, and so forth. For example, the output device 114 may comprise an electrophoretic display, a liquid crystal display, a light emitting diode (LED) display, a printed card that is mounted at or near an end of the support arm 108, and so forth.

A user 116 may interact with the inventory location such as the instrumented hook system 102. The user 116 may refer to the output device 114 to gather information about the items 106 associated with that output device 114, about the facility, other information such as advertisements or promotional materials, and so forth. The user 116 may then interact with the instrumented hook system 102. For example, the user 116 may remove item 106(1) from the hook 104(1) and place the item 106(1) into a tote 118, or may place the item 106(1) from the tote 118 to the hook 104(1). The tote 118 may be associated with the user 116 or that user's 116 user account.

Each hook 104 may include or be associated with one or more sensors 110. The sensors 110 may be positioned to gather information about the hook 104 or other type of inventory location. For example, one or more of the sensors 110 may be mounted above the hook 104, such as being supported by the support arm 108. The field-of-view of the respective sensors 110 may be directed toward the hook 104, a portion of the hook 104, an area in front of or proximate to the hook 104, and so forth.

In some implementations, one or more of the sensors 110 or portions thereof may be included within or as part of the hook 104. For example, part of a photodetector system such as a light source or a photodetector 110(8) may be mounted at the tip of the hook 104.

An inventory management system 120 may access the sensor data 112 generated by the sensors 110. The inventory management system 120 may be configured to perform various functions such tracking changes to a quantity on hand of the items 106 at the hook 104.

The inventory management system 120 may include or have access to an analysis module 122. The analysis module 122 may access information including, but not limited to, item data 124, sensor data 112, or other information.

The item data 124 provides information about a particular type of item 106, including characteristics of that type of item 106 such as physical dimensions, where that type of item 106 is located in the facility, characteristics about how the item 106 appears, capacitance values associated with the type of item 106, and so forth. The item data 124 may indicate the types and quantities of items 106 that are expected to be stored at that particular inventory location such as at hook 104, width and depth of that type of item 106, weight of the type of item 106 individually or in aggregate, sample images of the type of item 106, and so forth.

The item data 124 may include an item identifier. The item identifier may be used to distinguish one type of item 106 from another. For example, the item identifier may include a stock keeping unit (SKU) string, Universal Product Code (UPC) number, radio frequency identification (RFID) tag data, and so forth. The items 106 that are of the same type may be referred to by the same item identifier. For example, cans of beef flavor Brand X dog food may be represented by the item identifier value of "9811901181". In other implementations, non-fungible items 106 may each be provided with a unique item identifier, allowing each to be distinguished from one another.

The item data 124 may include one or more geometry data, item weight data, sample image data, sample capacitance data, or other data. The geometry data may include information indicative of size and shape of the item 106 in one, two, or three dimensions. For example, the geometry data may include the overall shape of an item 106, such as a cuboid, sphere, cylinder, and so forth. The geometry data may also include information such as length, width, depth, and so forth, of the item 106. Dimensional information in the geometry data may be measured in pixels, centimeters, inches, arbitrary units, and so forth. The geometry data may be for a single item 106, or a package, kit, or other grouping considered to be a single item 106. The item weight data comprises information indicative of a weight of a single item 106, or a package, kit, or other grouping considered to be a single item 106. The item data 124 may include other information. For example, the other information may be indicative of a weight distribution of the item 106, point cloud data for the item 106, and so forth.

The sample capacitance data may comprise data indicative of a previously measured or calculated change in capacitance of a representative capacitive sensor 110(2) based on or resulting from the presence or absence of a sample of the type of item 106. For example, during processing or intake of the item 106 at the facility, a sample of the type of item 106 may be placed on a capacitive sensor 110(2) to generate the sample capacitance data.

The sample image data may comprise one or more images of one or more of that type of item 106. For example, sample image data may be obtained during processing or intake of the item 106 to be used by the facility.

The item data 124 may include one or more inventory location identifiers (IDs). The inventory location ID is indicative of a particular area or volume of an inventory location such as a hook 104 that is designated for stowage of the type of item 106. For example, a single rack may have several hooks 104, each with a different inventory location ID. Each of the different inventory location IDs may be associated with a hook 104 or a lane on a shelf, the lane describing a particular area on the shelf designated for storage of a particular type of item 106. A single type of item 106 may be associated with a particular inventory location ID, a plurality of inventory location IDs may be associated with the single type of item 106, more than one type of item 106 may be associated with the particular inventory location ID, and so forth.

The item data 124 may also include quantity data. The quantity data may comprise a count or value indicative of a number of items 106. The count may be a measured or an estimated value. The quantity data may be associated with a particular inventory location ID, an entire facility, and so forth. For example, the same type of item 106 may be stored at different hooks 104 within the facility. The quantity data may indicate the quantity on hand for each of the different inventory locations.

The analysis module 122 may utilize sensor data 112 such as the weight data 112(1), the capacitance data 112(2), the image data 112(3), as well as the item data 124 and other information to generate interaction data 126. For example, the analysis module 122 may process the sensor data 112 using one or more machine learning techniques to generate the interaction data 126. The interaction data 126 is indicative of an action such as picking or placing an item 106 at a particular inventory location, presence of the user 116 at the inventory location, and so forth. By utilizing the interaction data 126, the inventory management system 120 may maintain accurate information with regard to the inventory held at a particular inventory location, items 106 that have been picked by a particular user 116, and so forth.

Figure 2:
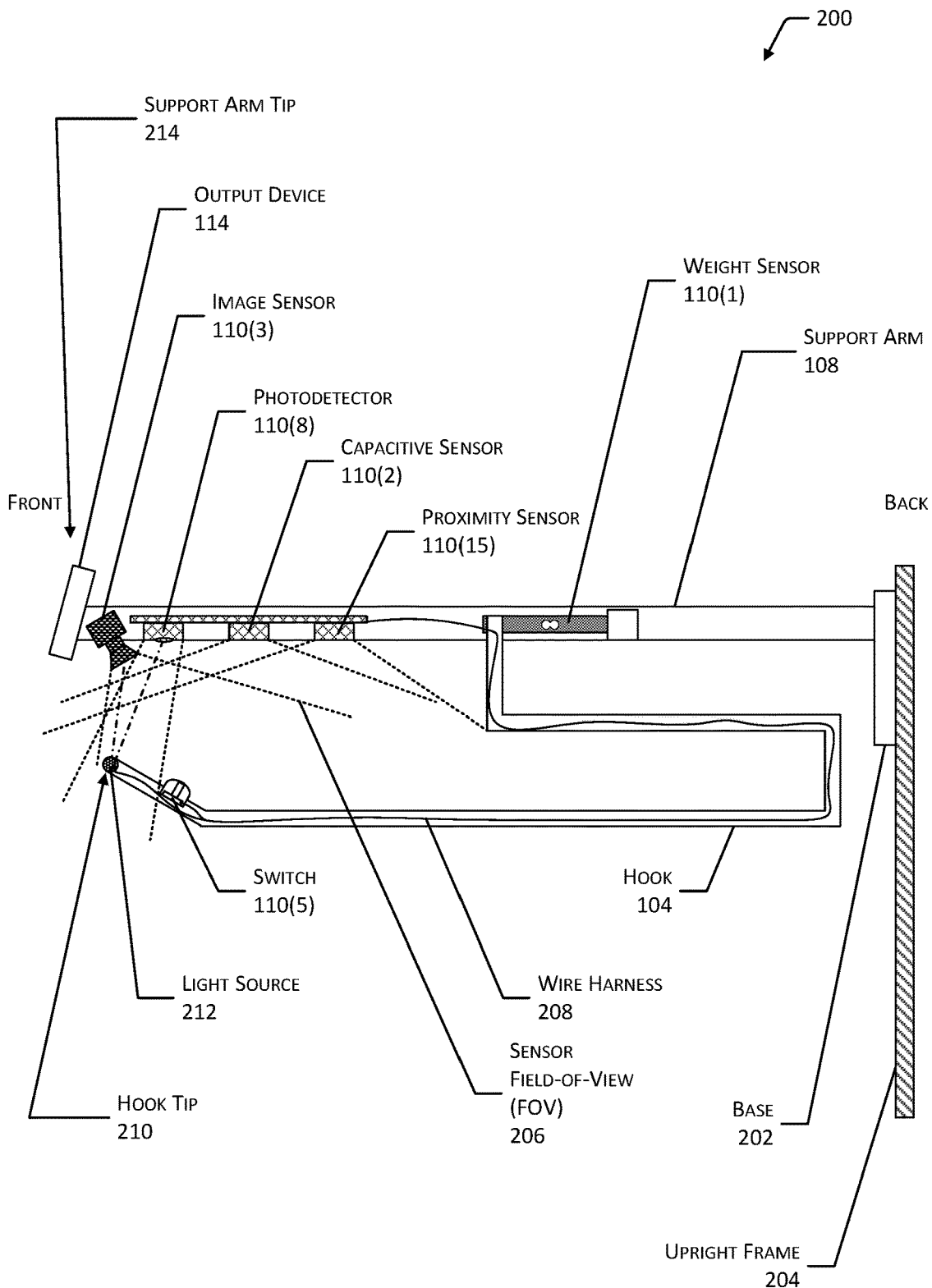
FIG. 2 illustrates a side view of an instrumented hook system with sensors integrated into the support arm, according to some implementations.

FIG. 2 illustrates a side view 200 of an instrumented hook system 102 with sensors 110 integrated into the support arm 108, according to some implementations. In this implementation, the support arm 108 is affixed to a base 202. The base 202 may include one or more mechanical, magnetic, or other fasteners used to affix the base 202 to an upright frame 204.

Mounted within or affixed to the support arm 108 are one or more sensors 110. The sensors 110 are depicted with their respective sensor field-of-view (FOV) 206 arranged generally downward toward the hook 104 or a front of the instrumented hook system 102, such as where the user 116 may be standing during operation.

One or more sensors 110 may be configured with a sensor FOV 206 that is directed toward the hook 104. The sensors 110 are described in more detail below with regard to FIG. 7. For example, the one or more sensors 110 may include weight sensors 110(1), capacitive sensors 110(2), image sensors 110(3) depth sensors 110(4), switches 110(5), photodetectors 110(8), proximity sensors 110(15), and so forth.

The weight sensor 110(1) may be used to determine the weight of a load supported by the hook 104. For example, the weight sensor 110(1) may comprise a load cell that has a first end affixed to the support arm 108 and a second end affixed to a hook suspension section of the hook 104, such as depicted here. As items 106 are added to or removed from the hook 104, the weight data 112(1) generated by the weight sensor 110(1) changes. Based at least in part on the weight data 112(1), a quantity on hand may be calculated, a quantity added or removed may be determined, and so forth. In the implementation depicted here, the hook 104 is suspended such that the single weight sensor 110(1) may determine the weight of the hook 104.

In some implementations, one or more sensors 110 or portions thereof may be incorporated into or supported by the hook 104. For example, a wire harness 208 may connect electronics within the support arm 108 to a switch 110(5) located proximate to a hook tip 210. The switch 110(5) may be configured to make or break an electrical contact responsive to the passage of an item 106 to or from a portion of the hook 104. For example, a portion of the item 106 may push against the switch 110(5) while it is being removed from the hook 104. This push may generate switch data 112(5) that may be indicative of the particular switch 110(5) that was activated, a duration of activation, and so forth.

In another example, the wire harness 208 may connect electronics within the support arm 108 to a light source 212 located proximate to the hook tip 210. The light source 212 may be configured to emit light that may be detected by the photodetector 110(8) when no obstruction exists between the light source 212 and the photodetector 110(8). As items 106 are added to or removed from the hook 104, their passage may occlude the emitted light. Photodetector data 112(6) that is indicative of time, duration, intensity of light received, and so forth, may be generated by a processor. For example, the photodetector data 112(6) may indicate that three occlusions took place. Based on these three occlusions, the analysis module 122 may determine that the quantity on hand at the hook 104 changed by a quantity of three. Weight data 112(1) obtained from the weight sensor 110(1) may be used to confirm the quantity, determine whether that quantity was added or removed, and otherwise disambiguate the interaction that took place.

In an alternative implementation, the photodetector 110(8) may be positioned at the hook tip 210, while the light source 212 is located elsewhere, such as on the support arm 108. In other implementations, optical waveguides, fiber optics, internal reflection of tubes, and so forth, may be used to direct the light to or from different portions of the apparatus. For example, the photodetector 110(8) and the light source 212 may both be located within the support arm 108, and one or more optical fibers may be used to direct emitted light to a particular exit point and to direct received light for a particular ingress point. In some implementations, the light source 212 as detected by the photodetector 110(8) may be an ambient or room light.

The sensor data 112 may be used to generate event data that is indicative of some activity occurring with respect to the hook 104. For example, capacitance data 112(2) from the capacitive sensor 110(2) may detect the presence of a hand of the user 116 at the hook 104. Based on this detection, event data indicative of a change at the hook 104 may be generated. Responsive to the event data, other sensor data 112 corresponding to one or more of times before, during, or after the detection may be acquired or accessed. Continuing the example, the event data may be indicative of a presence of a hand at a particular hook 104 at a particular time. The weight data 112(1) from before and after the event indicated by the event data may be processed to determine a weight change.

Different combinations of sensors 110 and the placement thereof with respect to the hook 104 may vary. For example, in some implementations, the depth sensor 110(4) may be located proximate to a support arm tip 214 or a front end of the support arm 108, such that the sensor FOV 206 includes a potential location where the user 116 may stand during use. In other implementations, such as described below with regard to FIGS. 4 and 5, weight sensors 110(1) may be used to obtain weight data 112(1) from a plurality of hooks 104, sensors 110 may be located on the sensor frame above and separate from the hooks 104, and so forth.

One or more output devices 114 may be mounted on a front of the support arm 108. In some implementations, the output device 114 or structures associated with the output device 114 may be used to conceal one or more of the sensors 110.

Figure 3:
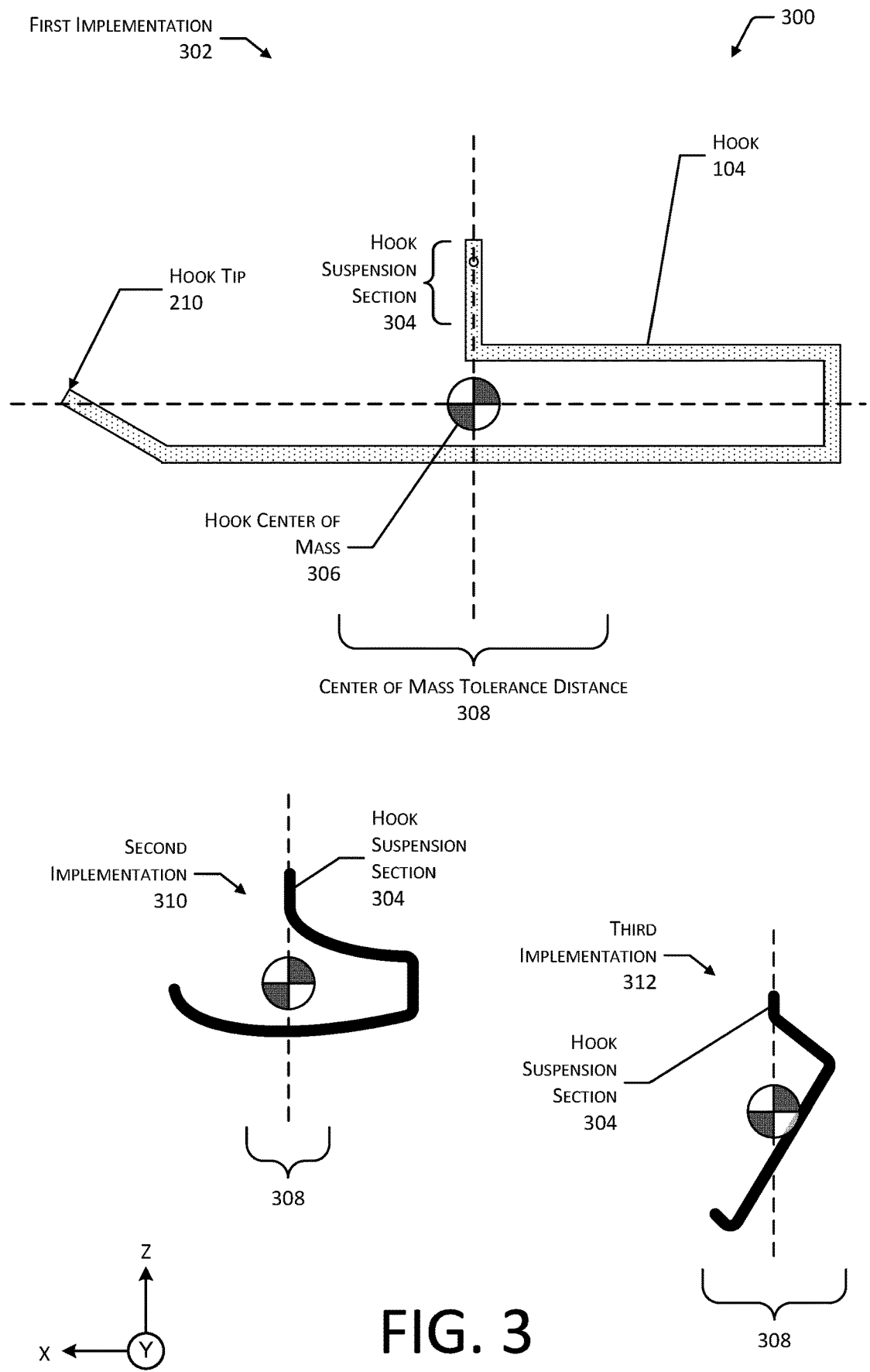
FIG. 3 illustrates a side view of different hook shapes, according to some implementations.

FIG. 3 illustrates a side view 300 of different hook shapes, according to some implementations. In the first implementation 302, the hook 104 is depicted. The hook 104 includes a hook suspension section 304. The hook suspension section 304 comprises a mechanical fitting, feature, or portion of the hook 104 that may be used to support the hook 104 and a load carried by the hook 104.

The hook 104 may be shaped, constructed, or otherwise configured to exhibit a hook center of mass 306 that is positioned within a center of mass tolerance distance 308 beneath the hook suspension section 304 during normal use. The hook center of mass 306 may be considered a point relative to the hook 104 at which a weighted relative position of mass as distributed through the hook 104 sums to zero. For example, the hook center of mass 306 may comprise a point at which an applied force causes the hook 104 to move without rotation. The hook center of mass 306 may be within a body of the hook 104 or may be external to the hook 104. For example, as shown in FIG. 3, the hook center of mass 306 is depicted as occurring within free space of an interior of a curve formed by the hook 104.

The center of mass tolerance distance 308 comprises a distance that the hook center of mass 306 may deviate from the hook suspension section 304 without adversely affecting operation of the weight sensor 110(1). For example, when the hook suspension section 304 of the hook 104 is affixed to a first end of a load cell in a weight sensor 110(1) and the hook center of mass 306 is within the center of mass tolerance distance 308, the torque (or lever arm) applied to the first end of the load cell is within the operational specification of the load cell. The weight data 112(1) resulting from the load cell may then be considered accurate and not adversely skewed by excessive torque. The center of mass tolerance distance 308 may comprise a horizontal distance between a vertical line extending from a center point of the hook suspension section 304 and a vertical line extending through a center of the hook center of mass 306.

For example, as depicted in the first implementation 302, the hook 104 may describe a "C" shape that includes three approximately right angle corners. In some implementations, the hook tip 210 may extend at an angle relative to another portion of the hook 104. For example, the hook tip 210 may be bent slightly upwards.

The center of mass tolerance distance 308 may differ based on different types of weight sensors 110(1) that are in use. For example, a first model of weight sensor 110(1) may have a center of mass tolerance distance 308 of 10 cm, while a second model of weight sensor 110(1) may have a center of mass tolerance distance 308 of 25 cm.

Other possible configurations of the hook 104 may be used. For example, a second implementation 310 and a third implementation 312 are also depicted. As described above, the hook center of mass 306 for each hook 104 is located within the center of mass tolerance distance 308 beneath their respective hook suspension sections 304.

The hook 104 may comprise materials that are bent, stamped, formed, forged, deposited, hardened, machined, and so forth. For example, the hook 104 may comprise one or more of metal wire, tubing, plastic, and so forth. The hook 104 may include one or more arcuate sections, with each arcuate section having a different radius of curvature.

Figure 4:
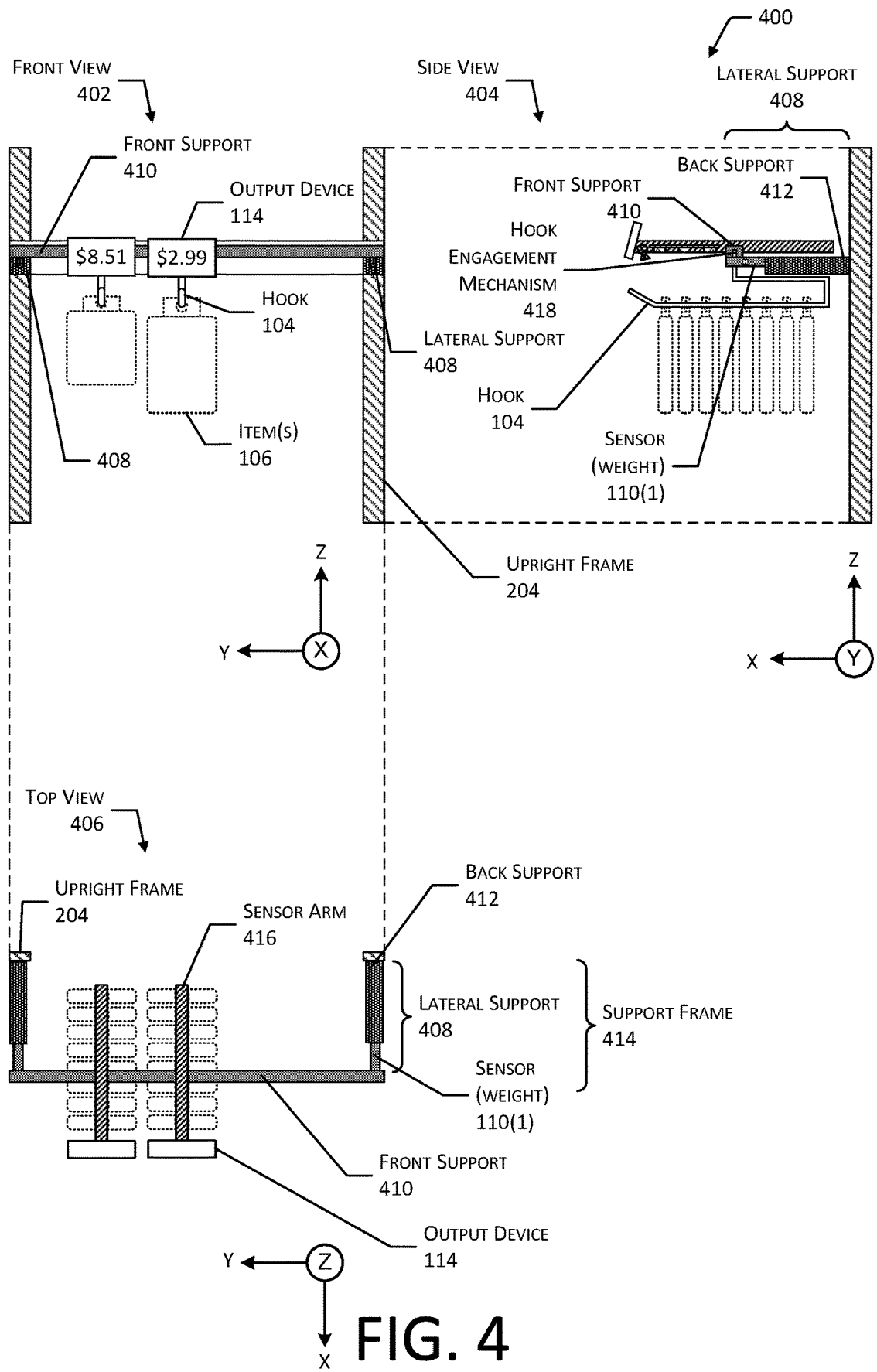
FIG. 4 illustrates several views of an instrumented hook system using shared weight sensors and instrumented sensor arms, according to some implementations.

FIG. 4 illustrates several views 400 of an instrumented hook system 102 using shared weight sensors 110(1) and instrumented sensor arms, according to some implementations. In this illustration, a front view 402, a side view 404, and a top view 406 are depicted.

In the front view 402, a pair of lateral supports 408 is depicted. Each of the lateral supports 408 may be affixed to an upright frame 204. Each of the lateral supports 408 may include a back support 412 and one or more weight sensors 110(1). The back support 412 may include one or more mechanical engagement features such as pegs that are configured to engage corresponding mechanical engagement features such as holes in the upright frame 204. A first end of the weight sensor 110(1) is affixed to or supported by the back support 412.

A front support 410 located distal to the upright frame 204 extends from a left lateral support 408 to a right lateral support 408. The front support 410 is supported at least in part by a second end of the weight sensors 110(1) that are part of the lateral supports 408. As a result, the weight sensors 110(1) are able to determine the load supported by the front support 410. The subassembly that includes the lateral supports 408 and the front support 410 may be designated as a support frame 414. The support frame 414 may support any number of sensor arms 416, hooks 104, and so forth.

The front support 410 may include one or more fastening features that are used to affix a portion of a sensor arm 416 to the front support 410. The fastening features may include mechanical engagement features, magnets, and so forth. For example, the sensor arm 416 may include a tab that engages a slot in the front support 410. The front support 410 may also include one or more hook engagement mechanisms 418 to mechanically engage one or more of the hook suspension sections 304 of the hooks 104. The hook engagement mechanism 418 may include a slot, bolt, screw, aperture, and so forth, that engages with one or more elements of the hook suspension section 304. For example, the hook engagement mechanism 418 may comprise an aperture into which the upper section of the hook suspension section 304 of the hook 104 is inserted and then retained using a set screw.

The sensor arm 416 may be affixed to the support frame 414. The front support 410 and the sensor arm 416 may be substantially perpendicular to one another in some implementations. The sensor arm 416 may include one or more of the sensors 110, such as described above. The hook 104 may be supported from one or more of the sensor arm 416 or the front support 410. The weight sensors 110(1) in the lateral supports 408 obtain weight data 112(1) associated with all of the hooks 104 that are supported by the support frame 414.

As a load supported by the hook 104 changes, the weight as measured by the weight sensors 110(1) in the lateral supports 408 may increase or decrease. By summing the weight data 112(1) obtained from the weight sensors 110(1) at all of the lateral supports 408, a total weight at an instant in time may be determined. Weight data 112(1) may be associated with a particular hook 104 based on sensor data 112 obtained from the other sensors 110, such as on the sensor arm 416. For example, output from the capacitive sensor 110(2) indicative of proximity of an object may be used to generate event data associated with hook 104(1). Based on the event data, subsequent change in the weight as measured by the weight sensors 110(1) at the lateral supports 408 may be associated with a first hook 104(1), instead of a second hook 104(2) on the same support frame 414.

A single support frame 414 may be used to support a plurality of hooks 104, sensor arms 416, and so forth. In some implementations, each hook 104 may have an associated sensor arm 416. In other implementations, a single sensor arm 416 may provide sensor data 112 for a plurality of hooks 104.

In some implementations, instead of, or in addition to, the use of hooks 104, a pegboard or similar structure may be supported by, or used in place of, the front support 410. The pegboard may comprise a series of holes or other mechanical engagement features. Hooks 104 or other support devices for holding items 106 may then be affixed to the pegboard.

Figure 5:
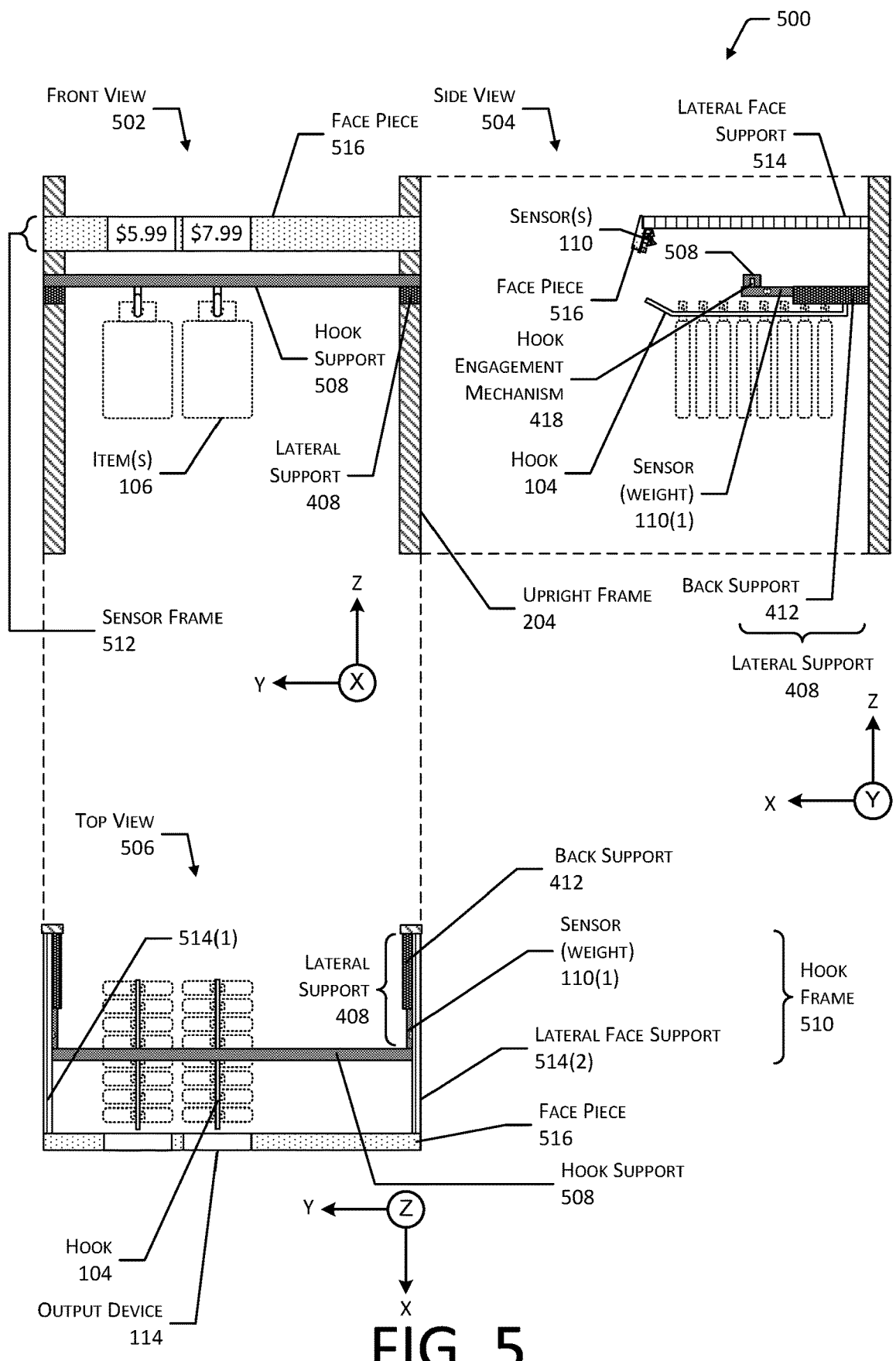
FIG. 5 illustrates several views of an instrumented hook system using shared weight sensors and a sensor frame, according to some implementations.

FIG. 5 illustrates several views 500 of an instrumented hook system 102 using shared weight sensors 110(1) and a separate sensor frame, according to some implementations. In this illustration, a front view 502, a side view 504, and a top view 506 are depicted.

In the front view 502, a pair of lateral supports 408 are depicted. Each of the lateral supports 408 may be affixed to an upright frame 204. As described above, each lateral support 408 may include a back support 412 with one or more mechanical engagement features such as pegs configured to engage corresponding mechanical engagement features such as holes in the upright frame 204. Each of the lateral supports 408 may also include one or more weight sensors 110(1). A first end of the weight sensor 110(1) may be affixed or otherwise mounted to the back support 412.

A hook support 508 is located distal to the upright frame 204 and extends from a left lateral support 408 to a right lateral support 408. The hook support 508 may be supported by a second end of the weight sensors 110(1). The subassembly that includes the lateral supports 408 and the hook support 508 may be designated as a hook frame 510. The hook support 508 may include a hook engagement mechanism 418, such as one or more fastening features that are used to retain one or more hooks 104. The fastening features may include mechanical engagement features, magnets, and so forth. For example, the hook engagement mechanism 418 may comprise a series of slots into which the hook suspension section 304 of the hook 104 may be mechanically engaged, allowing the body of the hook 104 to be suspended beneath.

Also depicted is a sensor frame 512 that may include a left lateral face support 514(1), a right lateral face support 514(2), and the face piece 516. The lateral face supports 514 may each be affixed to a respective upright frame 204. The sensor frame 512 is configured to support a sensor assembly that includes one or more of the sensors 110. The sensor frame 512 may be mounted above or below the hook frame 510. In some implementations, a sensor frame 512 may be mounted between an upper hook frame 510(1) and a lower hook frame 510(2), with sensors 110 arranged with a sensor FOV 206 to cover both hook frames 510. The sensor frame 512 may also include one or more of the output devices 114.

In the configuration depicted here, the weight of the items 106, hooks 104, hook support 508, and so forth, is supported by the lateral supports 408. Weight data 112(1) of the items 106 is determined using the weight sensors 110(1) in the lateral supports 408. The sensors 110 are supported separately from the upright frame 204 using the lateral face supports 514.

In one implementation, an image sensor 110(3) may be mounted on a face piece 516. The image sensor 110(3) may have with a FOV 206 directed generally towards a plurality of the hooks 104. For example, a rack comprising a plurality of hooks 104 may be viewed by a single camera. In another implementation, the image sensor 110(3) may be mounted to another structure, such as the ceiling overhead.

Figure 6:
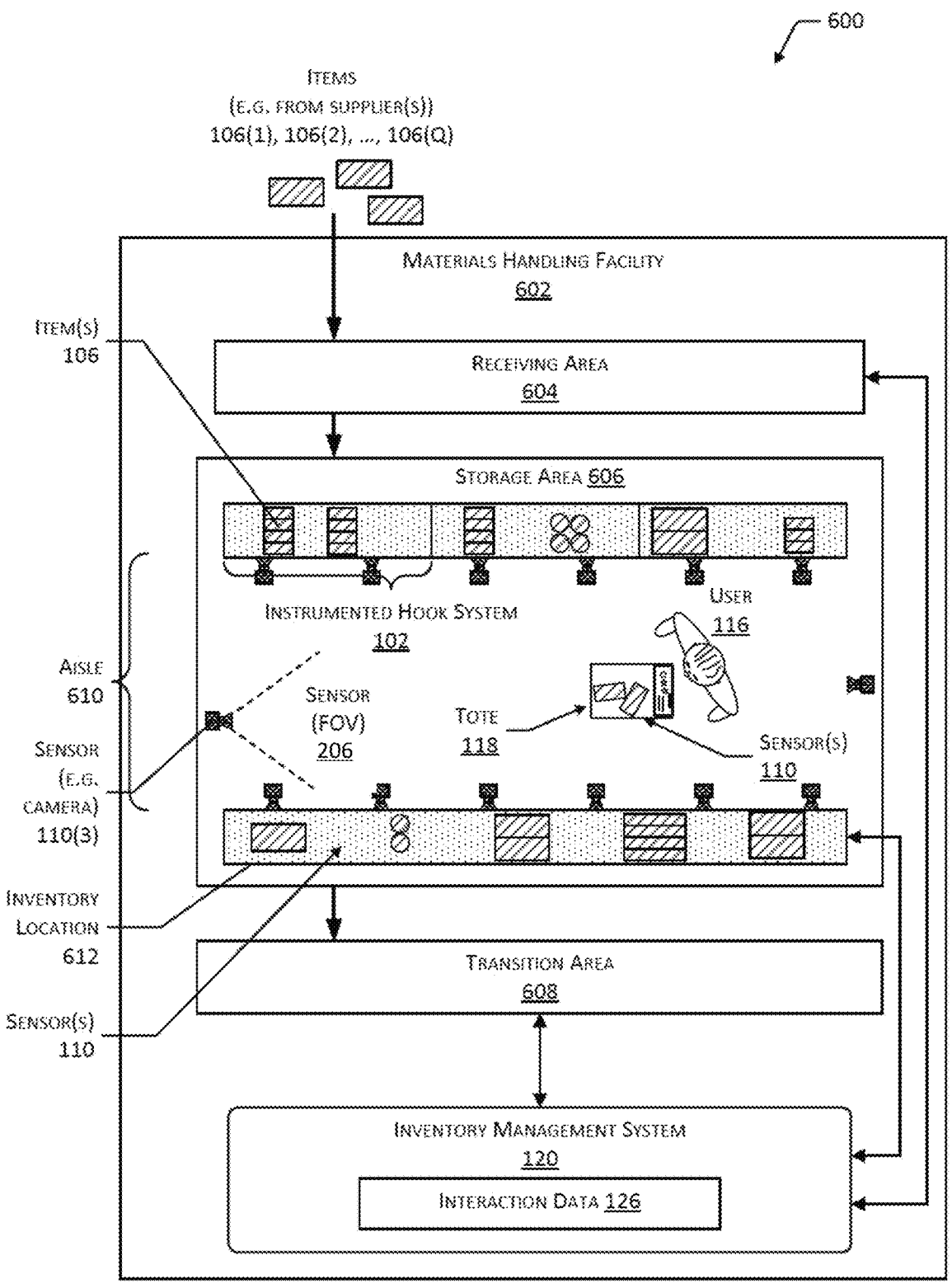
FIG. 6 is a block diagram illustrating a materials handling facility (facility) using the instrumented hook system, according to some implementations.

FIG. 6 is a block diagram 600 illustrating a materials handling facility (facility) 602 using the system 100, according to some implementations. A facility 602 comprises one or more physical structures or areas within which one or more items 106(1), 106(2), . . . , 106(Q) may be held. As used in this disclosure, letters in parenthesis such as "(Q)" indicate an integer value greater than or equal to zero. The items 106 may comprise physical goods, such as books, pharmaceuticals, repair parts, electronic gear, and so forth.

The facility 602 may include one or more areas designated for different functions with regard to inventory handling. In this illustration, the facility 602 includes a receiving area 604, a storage area 606, and a transition area 608.

The receiving area 604 may be configured to accept items 106, such as from suppliers, for intake into the facility 602. For example, the receiving area 604 may include a loading dock at which trucks or other freight conveyances unload the items 106. In some implementations, the items 106 may be processed, such as at the receiving area 604, to generate at least a portion of the item data 124. For example, an item 106 may be imaged or otherwise scanned to develop reference images or representations of the item 106 at the receiving area 604.

The storage area 606 is configured to store the items 106. The storage area 606 may be arranged in various physical configurations. In one implementation, the storage area 606 may include one or more aisles 610. The aisle 610 may be configured with, or defined by, inventory locations 612 on one or both sides of the aisle 610. The inventory locations 612 may include one or more of a hook 104, a shelf, a rack, a case, a cabinet, a bin, a floor location, or other suitable storage mechanisms for holding, supporting, or storing the items 106. For example, the inventory locations 612 may comprise racks with hooks 104 or shelves with lanes designated therein. The inventory locations 612 may be affixed to the floor or another portion of the structure of the facility 602. The inventory locations 612 may also be movable such that the arrangements of aisles 610 may be reconfigurable. In some implementations, the inventory locations 612 may be configured to move independently of an outside operator. For example, the inventory locations 612 may comprise a rack with a power source and a motor, operable by a computing device to allow the rack to move from one location within the facility 602 to another.

One or more users 116 and totes 118 or other material handling apparatuses may move within the facility 602. For example, the user 116 may move about within the facility 602 to pick or place the items 106 in various inventory locations 612, placing them on the tote 118 for ease of transport. The tote 118 is configured to carry or otherwise transport one or more items 106. For example, the tote 118 may include a basket, cart, bag, bin, and so forth. In other implementations, other material handling apparatuses such as robots, forklifts, cranes, aerial drones, and so forth, may move about the facility 602 picking, placing, or otherwise moving the items 106. For example, a robot may pick an item 106 from a first inventory location 612(1) and move the item 106 to a second inventory location 612(2).

One or more sensors 110 may be configured to acquire information in the facility 602. The sensors 110 may include, but are not limited to, weight sensors 110(1), capacitive sensors 110(2), image sensors 110(3), depth sensors 110(4), and so forth. The sensors 110 may be stationary or mobile, relative to the facility 602. For example, the inventory locations 612 may contain weight sensors 110(1) to acquire weight data 112(1) of items 106 stowed therein, image sensors 110(3) to acquire images of picking or placement of items 106 on hooks 104, optical sensor arrays 110(14) to detect shadows of the user's 116 hands at the inventory locations 612, and so forth. In another example, the facility 602 may include image sensors 110(3) to obtain images of the user 116 or other objects in the facility 602. The sensors 110 are discussed in more detail below with regard to FIG. 7.

While the storage area 606 is depicted as having one or more aisles 610, inventory locations 612 storing the items 106, sensors 110, and so forth, it is understood that the receiving area 604, the transition area 608, or other areas of the facility 602 may be similarly equipped. Furthermore, the arrangement of the various areas within the facility 602 is depicted functionally rather than schematically. For example, in some implementations, multiple different receiving areas 604, storage areas 606, and transition areas 608 may be interspersed rather than segregated in the facility 602.

The facility 602 may include, or be coupled to, the inventory management system 120. The inventory management system 120 is configured to interact with one or more of the users 116 or devices such as sensors 110, robots, material handling equipment, computing devices, and so forth, in one or more of the receiving area 604, the storage area 606, or the transition area 608.

The inventory management system 120 or other systems may use the sensor data 112 to track the location of objects within the facility 602, movement of the objects, or provide other functionality. Objects may include, but are not limited to, items 106, users 116, totes 118, and so forth. For example, a series of images acquired by the image sensor 110(3) may indicate removal by the user 116 of an item 106 from a particular location on the inventory location 612 and placement of the item 106 on or at least partially within the tote 118.

The facility 602 may be configured to receive different kinds of items 106 from various suppliers and to store them until a customer orders or retrieves one or more of the items 106. A general flow of items 106 through the facility 602 is indicated by the arrows of FIG. 6. Specifically, as illustrated in this example, items 106 may be received from one or more suppliers, such as manufacturers, distributors, wholesalers, and so forth, at the receiving area 604. In various implementations, the items 106 may include merchandise, commodities, perishables, or any suitable type of item 106, depending on the nature of the enterprise that operates the facility 602.

Upon being received from a supplier at the receiving area 604, the items 106 may be prepared for storage in the storage area 606. For example, in some implementations, items 106 may be unpacked or otherwise rearranged. The inventory management system 120 may include one or more software applications executing on a computer system to provide inventory management functions. These inventory management functions may include maintaining information indicative of the type, quantity, condition, cost, location, weight, or any other suitable parameters with respect to the items 106. The items 106 may be stocked, managed, or dispensed in terms of countable units, individual units, or multiple units, such as packages, cartons, crates, pallets, or other suitable aggregations. Alternatively, some items 106, such as bulk products, commodities, and so forth, may be stored in continuous or arbitrarily divisible amounts that may not be inherently organized into countable units. Such items 106 may be managed in terms of a measurable quantity such as units of length, area, volume, weight, time, duration, or other dimensional properties characterized by units of measurement. Generally speaking, a quantity of an item 106 may refer to either a countable number of individual or aggregate units of an item 106 or a measurable amount of an item 106, as appropriate.

After arriving through the receiving area 604, items 106 may be stored within the storage area 606. In some implementations, like items 106 may be stored or displayed together in the inventory locations 612 such as in bins, on hooks 104, on shelves, and so forth. In such an implementation, all items 106 of a given kind are stored in one inventory location 612. In other implementations, like items 106 may be stored in different inventory locations 612. For example, to optimize retrieval of certain items 106 having frequent turnover within a large physical facility 602, those items 106 may be stored in several different inventory locations 612 to reduce congestion that might occur at a single inventory location 612.

When a customer order specifying one or more items 106 is received, or as a user 116 progresses through the facility 602, the corresponding items 106 may be selected or "picked" from the inventory locations 612 containing those items 106. In various implementations, item picking may range from manual to completely automated picking. For example, in one implementation, a user 116 may have a list of items 106 they desire and may progress through the facility 602 picking items 106 from inventory locations 612 within the storage area 606 and placing those items 106 into a tote 118. In other implementations, employees of the facility 602 may pick items 106 using written or electronic pick lists derived from customer orders. These picked items 106 may be placed into the tote 118 as the employee progresses through the facility 602.

After items 106 have been picked, the items 106 may be processed at a transition area 608. The transition area 608 may be any designated area within the facility 602 where items 106 are transitioned from one location to another or from one entity to another. For example, the transition area 608 may be a packing station within the facility 602. When the item 106 arrives at the transition area 608, the item 106 may be transitioned from the storage area 606 to the packing station. Information about the transition may be maintained by the inventory management system 120.

In another example, if the items 106 are departing the facility 602, a list of the items 106 may be obtained and used by the inventory management system 120 to transition responsibility for, or custody of, the items 106 from the facility 602 to another entity. For example, a carrier may accept the items 106 for transport with that carrier accepting responsibility for the items 106 indicated in the list. In another example, a user 116 may purchase or rent the items 106 and remove the items 106 from the facility 602. During use of the facility 602, the user 116 may move about the facility 602 to perform various tasks, such as picking or placing the items 106 in the inventory locations 612.

The interaction data 126 may provide information about an interaction, such as a pick of an item 106 from the inventory location 612, a place of an item 106 to the inventory location 612, a touch made to an item 106 at the inventory location 612, a gesture associated with an item 106 at the inventory location 612, and so forth. The interaction data 126 may include one or more of the type of interaction, interaction location identifier indicative of where at the inventory location 612 the interaction took place, item identifier, quantity change to the item 106, user identifier, and so forth. The interaction data 126 may then be used to further update the item data 124. For example, the quantity of items 106 on hand at a particular hook 104 may be changed based on an interaction that picks or places one or more items 106 at an inventory location 612.

The inventory management system 120 may combine or otherwise utilize different types of data from different types of sensors 110. For example, weight data 112(1) obtained from weight sensors 110(1) at the inventory location 612 may be used instead of, or in conjunction with, one or more of the capacitance data 112(2) to determine the interaction data 126.

Figure 7:
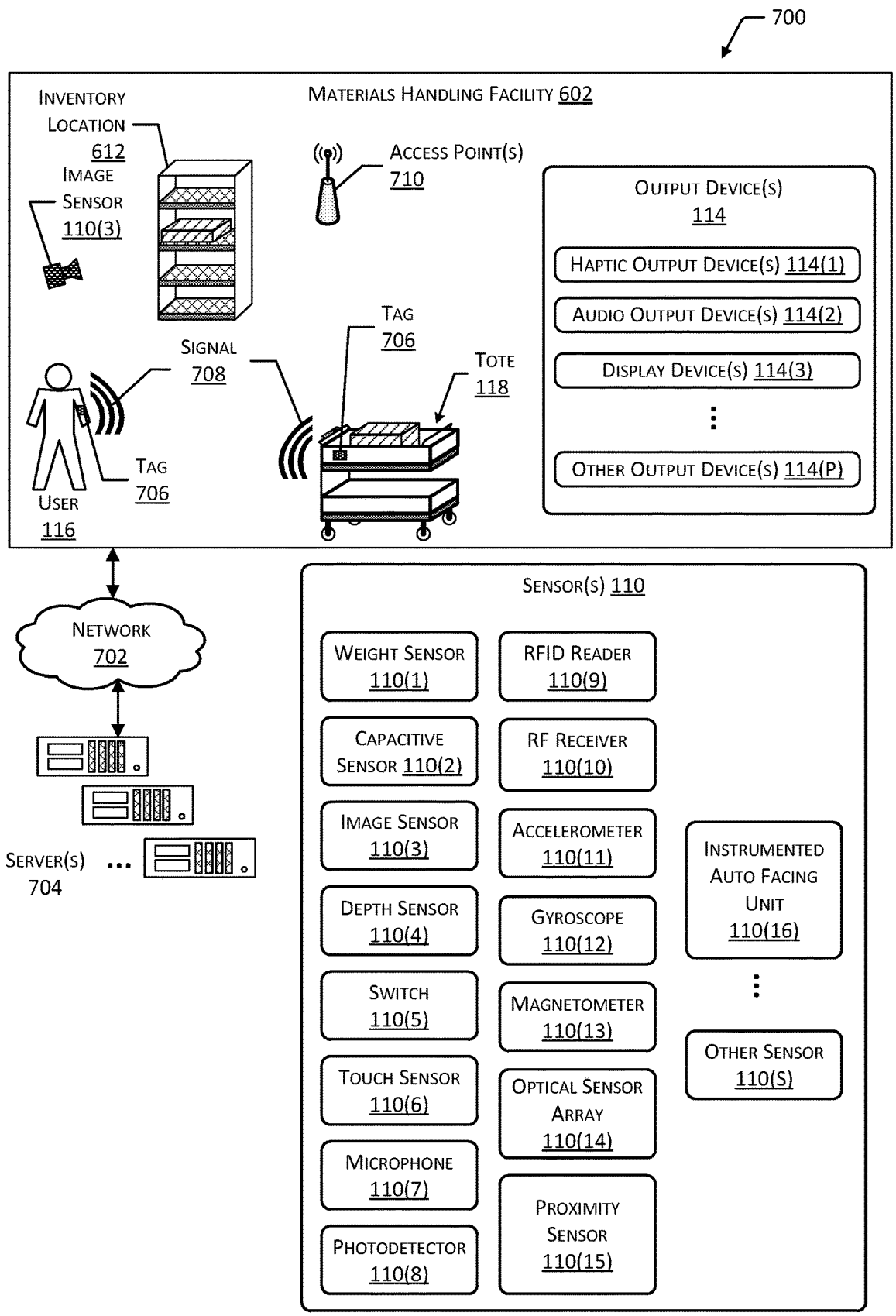
FIG. 7 is a block diagram illustrating additional details of the facility and sensors, according to some implementations.

FIG. 7 is a block diagram 700 illustrating additional details of the facility 602, according to some implementations. The facility 602 may be connected to one or more networks 702, which in turn connect to one or more servers 704. The network 702 may include private networks such as an institutional or personal intranet, public networks such as the Internet, or a combination thereof. The network 702 may utilize wired technologies (e.g., wires, fiber optic cables, and so forth), wireless technologies (e.g., radio frequency, infrared, acoustic, optical, and so forth), or other connection technologies. The network 702 is representative of any type of communication network, including one or more of data networks or voice networks. The network 702 may be implemented using wired infrastructure (e.g., copper cable, fiber optic cable, and so forth), a wireless infrastructure (e.g., cellular, microwave, satellite, and so forth), or other connection technologies.

The servers 704 may be configured to execute one or more modules or software applications associated with the inventory management system 120 or other systems. While the servers 704 are illustrated as being in a location outside of the facility 602, in other implementations, at least a portion of the servers 704 may be located at the facility 602. The servers 704 are discussed in more detail below with regard to FIG. 8.

The users 116, the totes 118, or other objects in the facility 602 may be equipped with one or more tags 706. The tags 706 may be configured to emit a signal 708. In one implementation, the tag 706 may be a radio frequency identification (RFID) tag 706 configured to emit a RF signal 708 upon activation by an external signal. For example, the external signal may comprise a radio frequency signal or a magnetic field configured to energize or activate the RFID tag 706. In another implementation, the tag 706 may comprise a transmitter and a power source configured to power the transmitter. For example, the tag 706 may comprise a Bluetooth Low Energy (BLE) transmitter and battery. In other implementations, the tag 706 may use other techniques to indicate presence of the tag 706. For example, an acoustic tag 706 may be configured to generate an ultrasonic signal 708, which is detected by corresponding acoustic receivers. In yet another implementation, the tag 706 may be configured to emit an optical signal 708.

The inventory management system 120 may be configured to use the tags 706 for one or more of identification of the object, determining a location of the object, and so forth. For example, the users 116 may wear tags 706, the totes 118 may have tags 706 affixed, and so forth, which may be read and, based at least in part on signal strength, used to determine identity and location.

Generally, the inventory management system 120 or other systems associated with the facility 602 may include any number and combination of input components, output components, and servers 704.

The one or more sensors 110 may be arranged at one or more locations within the facility 602. For example, the sensors 110 may be mounted on or within a floor, wall, at a ceiling, at an inventory location 612, on a tote 118, may be carried or worn by a user 116, and so forth.

The sensors 110 may include one or more weight sensors 110(1) that are configured to measure the weight of a load, such as the item 106, the tote 118, or other objects. The weight sensors 110(1) may be configured to measure the weight of the load at one or more of the inventory locations 612, the tote 118, on the floor of the facility 602, and so forth. For example, the inventory location 612 may include a plurality of hooks 104, lanes, or platforms, with one or more weight sensors 110(1) to provide weight data 112(1) about an individual hook 104, lane, or platform. The weight sensors 110(1) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 110(1) may operate as transducers that generate one or more signals based on an applied force, such as that of the load due to gravity. For example, the weight sensor 110(1) may comprise a load cell having a strain gauge and a structural member that deforms slightly when weight is applied. By measuring a change in the electrical characteristic of the strain gauge, such as capacitance or resistance, the weight may be determined. In another example, the weight sensor 110(1) may comprise a force sensing resistor (FSR). The FSR may comprise a resilient material that changes one or more electrical characteristics when compressed. For example, the electrical resistance of a particular portion of the FSR may decrease as the particular portion is compressed by an applied mechanical force. The inventory management system 120 may use the data acquired by the weight sensors 110(1) to identify an object, determine a change in the quantity of objects, determine a location of an object, maintain shipping records, and so forth.

The sensors 110 may include capacitive sensors 110(2). Circuitry associated with the capacitive sensor 110(2) generates capacitance data 112(2). The capacitive sensor 110(2) may comprise one or more conductive elements and a capacitive sensor module that includes electronics to determine the capacitance. The capacitive sensors 110(2) may be configured to utilize a far-field capacitance effect. The far-field capacitance effect may be determined by measuring the self-capacitance of the conductive elements, rather than a mutual capacitance. In one implementation, a known charge may be provided to the conductive element, and the resultant voltage may be measured between the conductive element and the ground. A shield comprising an electrical conductor may be arranged along one or more sides of the conductive element. For example, the shield may be separated from the conductive element by an electrical insulator. During operation, the shield may be driven to the same, (or a substantially similar) electrical potential as that provided to the conductive element. As a result of this, a voltage difference that is below a threshold voltage results between the shield and the conductive element. In some implementations, the voltage difference may be zero. The shield in this configuration directs the electric field generally away from the shield. This directionality may be used to prevent erroneous readings for objects on the back side of the conductive element, which may occur in an unshielded configuration. The directionality may also be used to provide a desired sensor FOV 206. In some implementations, a ground plane may be arranged behind the shield, opposite the conductive element. The ground plane may be separated from the shield by an electrical insulator. The ground plane may be connected to an earth ground in some implementations. Proximity of an object to the conductive element or contact by the object with the conductive element affects the charge on the conductive element, producing a change in the resultant voltage that may then be measured and used to determine a capacitance value.

The sensors 110 may include one or more image sensors 110(3). The one or more image sensors 110(3) may include cameras configured to acquire images of a scene. The image sensors 110(3) are configured to detect light in one or more wavelengths including, but not limited to, terahertz, infrared, visible, ultraviolet, and so forth. The image sensors 110(3) may comprise charge coupled devices (CCD), complementary metal oxide semiconductor (CMOS) devices, microbolometers, and so forth. The inventory management system 120 may use image data 112(3) acquired by the image sensors 110(3) during operation of the facility 602. For example, the inventory management system 120 may identify items 106, users 116, totes 118, and so forth, based at least in part on their appearance within the image data 112(3) acquired by the image sensors 110(3). The image sensors 110(3) may be mounted in various locations within the facility 602. For example, image sensors 110(3) may be mounted overhead, on inventory locations 612, may be worn or carried by users 116, may be affixed to totes 118, and so forth.

One or more depth sensors 110(4) may also be included in the sensors 110. The depth sensors 110(4) may be used to acquire distance data 112(4), spatial or three-dimensional (3D) data, and so forth, about objects within a sensor FOV 206. The depth sensors 110(4) may include optical time-of-flight systems, range cameras, lidar systems, sonar systems, radar systems, structured light systems, stereo vision systems, optical interferometry systems, and so forth.

The inventory management system 120 may use the distance data 112(4) acquired by the depth sensors 110(4) to determine a distance to an object, identify an object, determine a location of an object in 3D real space, and so forth. For example, the distance data 112(4) or depth data provided by an optical time-of-flight sensor may indicate the presence of a user's hand near a particular hook 104.

One or more switches 110(5) may be used to acquire information. The switches 110(5) may be used to detect passage of an item 106 on a hook 104, accept input from the user 116, and so forth. The switches 110(5) may comprise mechanical, capacitive, optical, or other mechanisms. For example, the switches 110(5) may comprise mechanical switches configured to accept an applied force from a touch of the item 106 to generate an input signal. The inventory management system 120 may use data from the switches 110(5) to generate event data.

The sensors 110 may include one or more touch sensors 110(6). The touch sensors 110(6) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 120 may use data from the touch sensors 110(6) to receive information from the user 116. For example, the touch sensor 110(6) may be integrated with the tote 118 to provide a touchscreen with which the user 116 may select from a menu one or more particular items 106 for picking, enter a manual count of items 106 at an inventory location 612, and so forth.

One or more microphones 112(7) may be configured to acquire information indicative of sound present in the environment. In some implementations, arrays of microphones 112(7) may be used. These arrays may implement beamforming techniques to provide for directionality of gain. The inventory management system 120 may use the one or more microphones 112(7) to acquire information from acoustic tags 706, accept voice input from the users 116, determine ambient noise level, and so forth.

The sensors 110 may include one or more photodetectors 110(8). The photodetectors 110(8) may be configured to provide photodetector data 112(6) indicative of one or more of color or intensity of light impinging thereupon. For example, the photodetector 110(8) may comprise a photodiode and associated circuitry configured to generate a signal or data indicative of an incident flux of photons. The photodetectors 110(8) may be sensitive to one or more of infrared light, visible light, or ultraviolet light. For example, the photodetectors 110(8) may be sensitive to infrared light, and infrared light sources such as light emitting diodes (LEDs) may provide illumination. The photodetectors 110(8) may include photodiodes, photoresistors, photovoltaic cells, quantum dot photoconductors, bolometers, pyroelectric infrared detectors, and so forth. For example, the photodetector 110(8) may use germanium photodiodes to detect infrared light.

One or more radio frequency identification (RFID) readers 110(9), near field communication (NFC) systems, and so forth, may be included as sensors 110. For example, the RFID readers 110(9) may be configured to read the RF tags 706. Information acquired by the RFID reader 110(9) may be used by the inventory management system 120 to identify an object associated with the RF tag 706 such as the item 106, the user 116, the tote 118, and so forth. For example, based on information from the RFID readers 110(9) detecting the RF tag 706 at different times and RFID readers 110(9) having different locations in the facility 602, a velocity of the RF tag 706 may be determined.

One or more RF receivers 110(10) may also be included as sensors 110. In some implementations, the RF receivers 110(10) may be part of transceiver assemblies. The RF receivers 110(10) may be configured to acquire RF signals 708 associated with Wi-Fi, Bluetooth, ZigBee, 4G, 3G, LTE, or other wireless data transmission technologies. The RF receivers 110(10) may provide information associated with data transmitted via radio frequencies, signal strength of RF signals 708, and so forth. For example, information from the RF receivers 110(10) may be used by the inventory management system 120 to determine a location of an RF source, such as a communication interface onboard the tote 118.

The sensors 110 may include one or more accelerometers 110(11), which may be worn or carried by the user 116, mounted to the tote 118, and so forth. The accelerometers 110(11) may provide information such as the direction and magnitude of an imposed acceleration. Data such as rate of acceleration, determination of changes in direction, speed, and so forth, may be determined using the accelerometers 110(11).

A gyroscope 110(12) may provide information indicative of rotation of an object affixed thereto. For example, the tote 118 or other objects may be equipped with a gyroscope 110(12) to provide data indicative of a change in orientation of the object.

A magnetometer 110(13) may be used to determine an orientation by measuring ambient magnetic fields, such as the terrestrial magnetic field. The magnetometer 110(13) may be worn or carried by the user 116, mounted to the tote 118, and so forth. For example, the magnetometer 110(13) mounted to the tote 118 may act as a compass and provide information indicative of which direction the tote 118 is oriented.

An optical sensor array 110(14) may comprise one or more photodetectors 110(8). The photodetectors 110(8) may be arranged in a regular, repeating, or periodic two-dimensional arrangement such as a grid. The optical sensor array 110(14) may generate image data 112(3). For example, the optical sensor array 110(14) may be arranged within or below an inventory location 612 and obtain information about shadows of items 106, hand of the user 116, and so forth.

The sensors 110 may include proximity sensors 110(15) used to determine presence of an object, such as the user 116, the tote 118, and so forth. The proximity sensors 110(15) may use optical, electrical, ultrasonic, electromagnetic, or other techniques to determine a presence of an object. In some implementations, the proximity sensors 110(15) may use an optical emitter and an optical detector to determine proximity. For example, an optical emitter may emit light, a portion of which may then be reflected by the object back to the optical detector to provide an indication that the object is proximate to the proximity sensor 110(15). In other implementations, the proximity sensors 110(15) may comprise a capacitive proximity sensor 110(15) configured to provide an electrical field and determine a change in electrical capacitance due to presence or absence of an object within the electrical field.

The proximity sensors 110(15) may be configured to provide proximity data 112(7) indicative of one or more of a presence or absence of an object, a distance to the object, or characteristics of the object. An optical proximity sensor 110(15) may use time-of-flight (ToF), structured light, interferometry, or other techniques to generate the distance data 112(4). For example, an optical time-of-flight sensor determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 110 such as an image sensor 110(3). Based on an apparent distance between the features of the structured light pattern, the distance to the object may be calculated. Other techniques may also be used to determine distance to the object. In another example, the color of the reflected light may be used to characterize the object, such as skin, clothing, tote 118, and so forth.

In some implementations, the proximity sensors 110(15) may include the capacitive sensor 110(2), the depth sensor 110(4), and so forth. For example, a change in capacitance values from one time to another as measured by the capacitive sensor 110(2) may be compared to a threshold value and used to determine an object is proximate. In another example, distance data 112(4) obtained from the depth sensor 110(4) may be compared with a threshold value to determine if an object is deemed proximate.

The sensors 110 may also include an instrumented autofacing unit (IAFU) 112(16). The IAFU 110(16) may comprise a position sensor configured to provide data indicative of displacement of a pusher. As an item 106 is removed from the IAFU 110(16), the pusher moves, such as under the influence of a spring, and pushes the remaining items 106 in the IAFU 110(16) to the front of the inventory location 612. By using data from the position sensor, and given item data 124 such as a depth of an individual item 106, a count may be determined, based on a change in position data. For example, if each item 106 is 1 inch deep and the position data indicates a change of 7 inches, the quantity held by the IAFU 110(16) may have changed by 7 items 106. This count information may be used to confirm or provide a cross check for a count obtained by other means, such as analysis of the weight data 112(1), the capacitance data 112(2), the image data 112(3), and so forth.

The sensors 110 may include other sensors 110(S) as well. For example, the other sensors 110(S) may include light curtains, ultrasonic rangefinders, thermometers, barometric sensors, hygrometers, and so forth. For example, the inventory management system 120 may use information acquired from thermometers and hygrometers in the facility 602 to direct the user 116 to check on delicate items 106 stored in a particular inventory location 612, which is overheating, too dry, too damp, and so forth.

In one implementation, a light curtain may utilize a linear array of light emitters and a corresponding linear array of light detectors. For example, the light emitters may comprise a line of infrared LEDs or vertical cavity surface emitting lasers (VCSELs) that are arranged above and in front of the inventory location 612, while the light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the hand of the user 116 crossing this lightplane would prevent at least some of the light from light emitters from reaching a corresponding light detector. As a result, a position of the object along the linear array may be determined that is indicative of a touchpoint. This position may be expressed as touchpoint data, with the touchpoint being indicative of the intersection between the hand of the user 116 and the sheet of infrared light. In some implementations, a pair of light curtains may be arranged at right angles relative to one another to provide two-dimensional touchpoint data indicative of a position of touch in a plane. Input from the light curtain, such as indicating occlusion from a hand of a user 116 may be used to generate event data.

In some implementations, the image sensor 110(3) or other sensors 110(S) may include hardware processors, memory, and other elements configured to perform various functions. For example, the image sensors 110(3) may be configured to generate image data 112(3), send the image data 112(3) to another device such as the server 704, and so forth.

The facility 602 may include one or more access points 710 configured to establish one or more wireless networks. The access points 710 may use Wi-Fi, NFC, Bluetooth, or other technologies to establish wireless communications between a device and the network 702. The wireless networks allow the devices to communicate with one or more of the sensors 110, the inventory management system 120, the optical sensor arrays 112(14), the tags 706, a communication device of the tote 118, or other devices.

Output devices 114 may also be provided in the facility 602. The output devices 114 are configured to generate signals, which may be perceived by the user 116 or detected by the sensors 110. In some implementations, the output devices 114 may be used to provide illumination of the optical sensor array 112(14).

Haptic output devices 114(1) are configured to provide a signal that results in a tactile sensation to the user 116. The haptic output devices 114(1) may use one or more mechanisms such as electrical stimulation or mechanical displacement to provide the signal. For example, the haptic output devices 114(1) may be configured to generate a modulated electrical signal, which produces an apparent tactile sensation in one or more fingers of the user 116. In another example, the haptic output devices 114(1) may comprise piezoelectric or rotary motor devices configured to provide a vibration, which may be felt by the user 116.

One or more audio output devices 114(2) may be configured to provide acoustic output. The acoustic output includes one or more of infrasonic sound, audible sound, or ultrasonic sound. The audio output devices 114(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 114(3) may be configured to provide output, which may be seen by the user 116 or detected by a light-sensitive sensor such as an image sensor 110(3) or a photodetector 110(8). In some implementations, the display devices 114(3) may be electronically controlled to produce output in one or more of infrared, visible, or ultraviolet light. The output may be monochrome or in color. The display devices 114(3) may be one or more of emissive, reflective, microelectromechanical, and so forth. An emissive display device 114(3), such as using LEDs, electroluminescent elements, quantum dots, and so forth, is configured to emit light during operation. In comparison, a reflective display device 114(3), such as using an electrophoretic or interferometric element, relies on ambient light to present an image. Backlights or front lights may be used to illuminate non-emissive display devices 114(3) to provide visibility of the output in conditions where the ambient light levels are low. In some implementations, the display devices 114(3) may comprise pre-printed tags, labels, and so forth.

The display devices 114(3) may be located at various points within the facility 602. For example, the electronically controlled display devices 114(3) may be located on inventory locations 612, totes 118, on the floor of the facility 602, and so forth.

Other output devices 114(P) may also be present. For example, the other output devices 114(P) may include scent/odor dispensers, document printers, 3D printers or fabrication equipment, and so forth.

Figure 8:
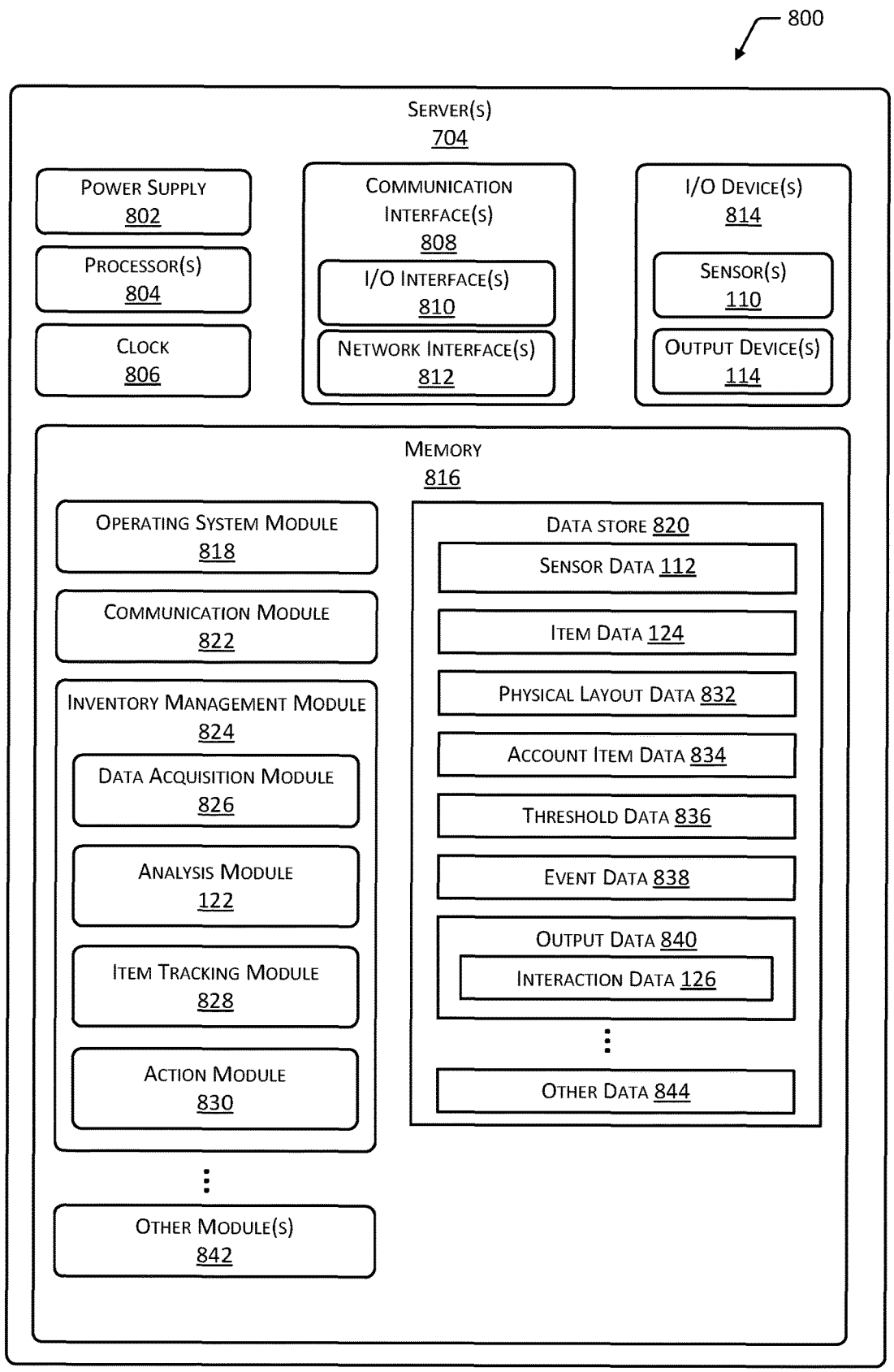
FIG. 8 is a block diagram of a server to support operation of the facility, according to some implementations.

FIG. 8 illustrates a block diagram 800 of a server 704 configured to support operation of the facility 602, according to some implementations. The server 704 may be physically present at the facility 602, may be accessible by the network 702, or a combination of both. The server 704 does not require end-user knowledge of the physical location and configuration of the system that delivers the services. Common expressions associated with the server 704 may include "on-demand computing", "software as a service (SaaS)", "platform computing", "network-accessible platform", "cloud services", "data centers", and so forth. Services provided by the server 704 may be distributed across one or more physical or virtual devices.

One or more power supplies 802 may be configured to provide electrical power suitable for operating the components in the server 704. The one or more power supplies 802 may comprise batteries, capacitors, fuel cells, photovoltaic cells, wireless power receivers, conductive couplings suitable for attachment to an external power source such as provided by an electric utility, and so forth. The server 704 may include one or more hardware processors 804 (processors) configured to execute one or more stored instructions. The processors 804 may comprise one or more cores. One or more clocks 806 may provide information indicative of date, time, ticks, and so forth. For example, the processor 804 may use data from the clock 806 to associate a particular interaction with a particular point in time.

The server 704 may include one or more communication interfaces 808 such as input/output (I/O) interfaces 810, network interfaces 812, and so forth. The communication interfaces 808 enable the server 704, or components thereof, to communicate with other devices or components. The communication interfaces 808 may include one or more I/O interfaces 810. The I/O interfaces 810 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 810 may couple to one or more I/O devices 814. The I/O devices 814 may include input devices such as one or more of a sensor 110, keyboard, mouse, scanner, and so forth. The I/O devices 814 may also include output devices 114 such as one or more of a display device 114(3), printer, audio speakers, and so forth. In some embodiments, the I/O devices 814 may be physically incorporated with the server 704 or may be externally placed.

The network interfaces 812 may be configured to provide communications between the server 704 and other devices, such as the totes 118, routers, access points 710, and so forth. The network interfaces 812 may include devices configured to couple to personal area networks (PANs), local area networks (LANs), wireless local area networks (WLANs), wide area networks (WANs), and so forth. For example, the network interfaces 812 may include devices compatible with Ethernet, Wi-Fi, Bluetooth, ZigBee, and so forth.

The server 704 may also include one or more busses or other internal communications hardware or software that allow for the transfer of data between the various modules and components of the server 704.

As shown in FIG. 8, the server 704 includes one or more memories 816. The memory 816 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 816 provides storage of computer-readable instructions, data structures, program modules, and other data for the operation of the server 704. A few example functional modules are shown stored in the memory 816, although the same functionality may alternatively be implemented in hardware, firmware, or as a system on a chip (SoC).

The memory 816 may include at least one operating system (OS) module 818. The OS module 818 is configured to manage hardware resource devices such as the I/O interfaces 810, the I/O devices 814, the communication interfaces 808, and provide various services to applications or modules executing on the processors 804. The OS module 818 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 816 may be a data store 820 and one or more of the following modules. These modules may be executed as foreground applications, background tasks, daemons, and so forth. The data store 820 may use a flat file, database, linked list, tree, executable code, script, or other data structure to store information. In some implementations, the data store 820 or a portion of the data store 820 may be distributed across one or more other devices including the servers 704, network attached storage devices, and so forth.

A communication module 822 may be configured to establish communications with one or more of the totes 118, sensors 110, display devices 114(3), other servers 704, or other devices. The communications may be authenticated, encrypted, and so forth.

The memory 816 may store an inventory management module 824. The inventory management module 824 is configured to provide the inventory functions as described herein with regard to the inventory management system 120. For example, the inventory management module 824 may track items 106 between different inventory locations 612, to and from the totes 118, and so forth.

The inventory management module 824 may include one or more of a data acquisition module 826, the analysis module 122, an item tracking module 828, an action module 830, and so forth. The data acquisition module 826 may be configured to acquire and access information associated with operation of the facility 602. For example, the data acquisition module 826 may acquire sensor data 112 such as the weight data 112(1), capacitance data 112(2), image data 112(3), and so forth. The sensor data 112 may be accessed by the other modules for use.

The analysis module 122 may be configured to use information such as one or more of the sensor data 112, item data 124, physical layout data 832, and so forth, to generate information such as event data 838, the interaction data 126, and so forth. The event data 838 may comprise information indicative of a change deemed to be significant that is associated with an inventory location 612 or portion thereof. For example, the event data 838 may be indicative of a determination by a capacitive sensor 110(2) of proximity of an object, such as an item 106 or user 116. In another example, the event data 838 may comprise an indication that a weight change has exceeded a threshold value. In yet another example, the event data 838 may indicate that motion between a plurality of images has been detected that exceeds a threshold value. The analysis module 122 may utilize one or more filter functions, comparison functions, and so forth, to determine the event data 838. For example, the event data 838 may result from a determination that the capacitance data 112(2) and weight data 112(1) have each experienced changes that exceed respective threshold values. The analysis module 122 may utilize various rules or conditions to determine the occurrence of an event and subsequent generation of event data 838.

The analysis module 122 may also accept as input other sensor data 112, such as input from a photodetector 110(8), accelerometer 110(11), RF receiver 110(10), and so forth. The analysis module 122 may process the sensor data 112 using various techniques. For example, the image data 112(3) may be processed to generate information indicative of changes between images, object recognition data, and so forth.

Processing of one or more of the image data 112(3) or portions thereof may be performed by implementing, at least in part, one or more of the following tools or techniques. In one implementation, processing of the image data 112(3) may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the image data 112(3). In still another implementation, functions such as those in the Machine Vision Toolbox for Matlab (MVTB) available using MATLAB as developed by MathWorks, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 112 or other data. For example, the ANN may be a trained using a supervised learning algorithm such that object identifiers are associated with images of particular objects within training images provided to the ANN. Once trained, the ANN may be provided with the sensor data 112 and the item data 124 to allow for a determination of similarity between two or more images.

The analysis module 122 may generate the interaction data 126. The interaction data 126 may include information indicative of a particular inventory location 612 at which some activity has taken place, such as a pick or place of an item 106. Location information for an interaction may indicate a particular hook 104, coordinates of the point or area at an inventory location 612 that includes several hooks 104, and so forth. The interaction may comprise movement, presence, pick, place, and so forth, of an object or an item 106. For example, a location associated with a pick may be determined by detecting a user 116 with a sensor 110 associated with a particular instrumented hook system 102 at that location. The analysis module 122 may access the item data 124 to determine the type of item 106 stored at the hook 104 and other characteristics about the type of item 106 such as a per item weight. The analysis module 122 may use other modules (not shown) to determine a quantity. For example, weight data 112(1) may be used to determine a weight change value, and this weight change value may be compared with the per item weight to determine a quantity of items 106 that have changed. A sign of the weight change may be used to determine addition or removal of an item 106. For example, a positive weight change value may indicate an increase in weight indicative of placement of an item 106 at an inventory location 612, while a negative weight change value may indicate a decrease in the weight indicative of pick of an item 106 from the inventory location 612. In some implementations, the interaction data 126 may indicate a quantity and type of item 106 that was added or removed from a particular inventory location 612.

The item tracking module 828 may access physical layout data 832 and generate account item data 834. The physical layout data 832 may provide information indicative of where sensors 110 and inventory locations 612 are in the facility 602 with respect to one another, FOV 206 of sensors 110 relative to the inventory location 612, and so forth. For example, the physical layout data 832 may comprise information representative of a map or floor plan of the facility 602 with relative positions of inventory locations 612, planogram data indicative of how items 106 are to be arranged at the inventory locations 612, and so forth.

The physical layout data 832 may associate a particular inventory location ID with other information such as physical location data, sensor position data, sensor direction data, sensor identifiers, and so forth. The physical location data provides information about where in the facility 602 objects are, such as the inventory location 612, the sensors 110, and so forth. In some implementations, the physical location data may be relative to another object. For example, the physical location data may indicate that a particular weight sensor 110(1), capacitive sensor 110(2), or image sensor 110(3) is associated with the hook 104(1).

The item tracking module 828 may be configured to determine a location within the facility 602, a user 116, a user account, and so forth, that is associated with one or more items 106. For example, the item tracking module 828 may determine that an item 106 has been removed from hook 104(1) and placed into the tote 118. The item tracking module 828 may then determine the tote 118 is associated with the user 116 or the user account that represents the user 116. The item tracking module 828 may also use the interaction data 126. For example, the interaction data 126 indicative of a particular type of item 106 being removed from a particular inventory location 612 may be used as part of the input to track the items 106 that are in the custody of a particular user 116.

The item tracking module 828 may access information from sensors 110 within the facility 602, such as those at the instrumented hook system 102 or other inventory locations 612, onboard the tote 118 or carried by or worn by the user 116. For example, the item tracking module 828 may receive information from a radio frequency identification (RFID) reader at the inventory location 612 that is indicative of tags associated with each of the items 106 that are placed onto the hook 104.

The account item data 834 comprises information indicative of one or more items 106 that are within the custody of a particular user 116, within a particular tote 118, and so forth. For example, the account item data 834 may comprise a list of the contents of the tote 118. That list may be further associated with the user account representative of the user 116. In another example, the account item data 834 may comprise a list of items 106 that the user 116 is carrying. The item tracking module 828 may use the account item data 834 to determine subsets of possible items 106 with which the user 116 may have interacted.

The inventory management module 824, and modules associated therewith, may access sensor data 112, threshold data 836, and so forth. The threshold data 836 may comprise one or more thresholds, ranges, percentages, and so forth, that may be used by the various modules in operation. For example, the analysis module 122 may access threshold data 836 to determine event data 838.

The inventory management module 824 may generate output data 840. For example, the output data 840 may include the interaction data 126, inventory levels for individual types of items 106, overall inventory, and so forth.

The action module 830 may be configured to initiate or coordinate one or more actions responsive to output data 840. For example, the action module 830 may access output data 840 that indicates a particular inventory location 612 is empty and in need of restocking. An action such as dispatch of a work order or transmitting instructions to a robot may be performed to facilitate restocking of the location.

In some implementations, the item tracking module 828 may process image data 112(3) using one or more machine vision counting techniques to determine a count of the items 106. For example, machine vision counting techniques may be configured to recognize a top or front portion of the items 106 in the image data 112(3). This determination may be based on item data 124, such as previously acquired images of a sampled item 106. Each of the tops of the type of item 106 appearing in the image data 112(3) may be identified and a count made. A change in count may be determined based on image data 112(3) obtained at a first time and a second time, respectively.

In one implementation, the item tracking module 828 may use one or more algorithms to determine the items 106 in the sensor FOV 206. For example, a histogram of gradients (HOG) algorithm may be used to extract the features of the items 106. A state vector machine (SVM) may then be used to classify the extracted features and determine which of the extracted features correspond to items 106. Output data 840 may be generated that is the resulting count of the items 106 determined by the SVM to be in the image data 112(3).

Other modules 842 may also be present in the memory 816 as well as other data 844 in the data store 820. For example, the other modules 842 may include an accounting module while the other data 844 may include billing data. The accounting module may be configured to assess charges to accounts associated with particular users 116 or other entities, while the billing data may include information such as payment account numbers.

Illustrative Processes

Figure 9:
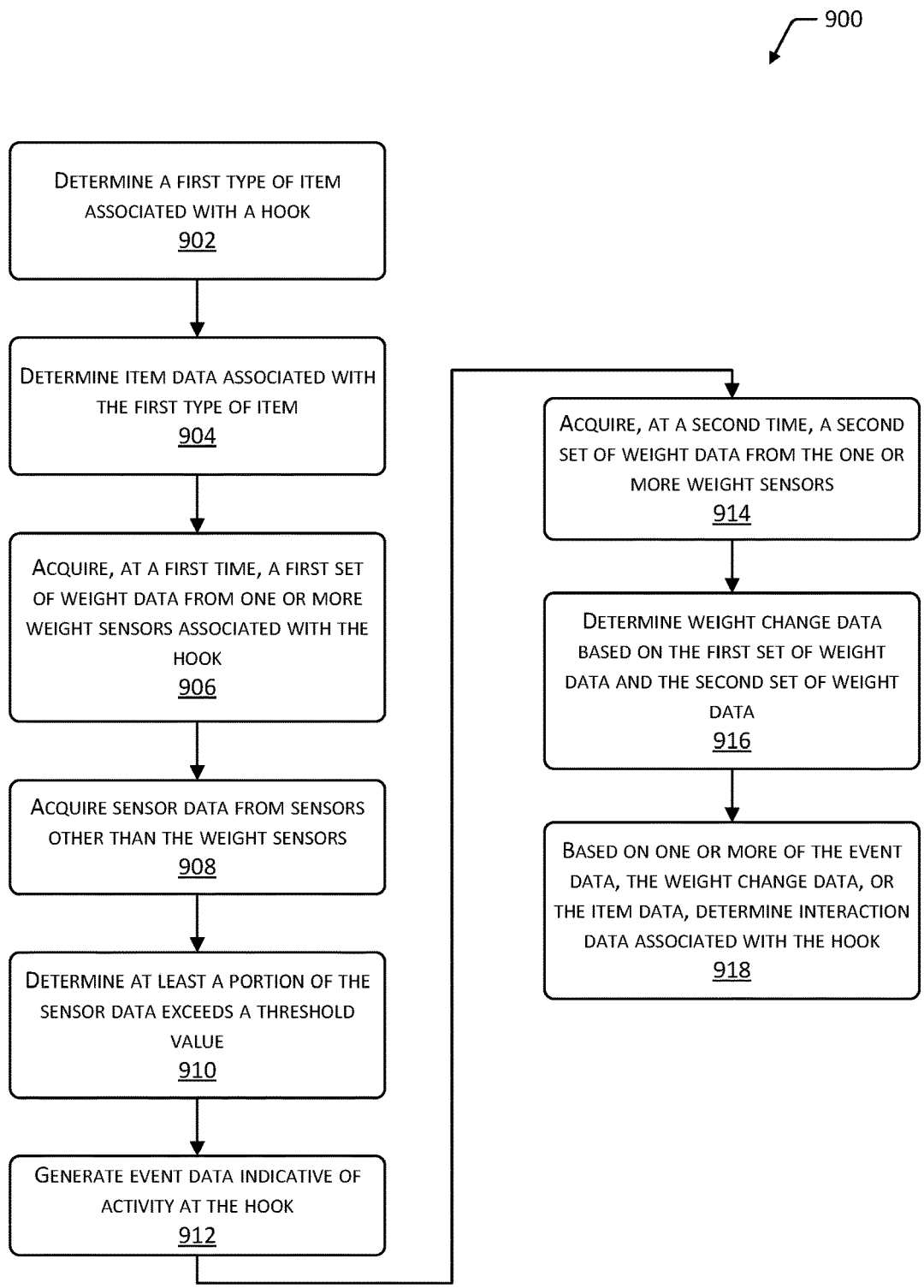
FIG. 9 depicts a flow diagram of a process for generating interaction data using an instrumented hook system, according to some implementations.

FIG. 9 depicts a flow diagram 900 of a process for generating interaction data 126 using an instrumented hook system 102, according to some implementations. The process may be implemented at least in part by one or more of a computing device at the inventory location 612, by the server 704, or by another computing device.

At 902, a first type of item 106 associated with a hook 104 is determined. For example, the item data 124 may be queried to determine the type of item 106 given a particular identifier indicative of a particular hook 104.

At 904, item data 124 associated with the first type of item 106 is determined. For example, the weight of an individual item 106 may be retrieved.

At 906, a first set of weight data 112(1) is acquired, at a first time, from one or more weight sensors 110(1) associated with the hook 104. For example, the weight data 112(1) for the weight sensors 110(1) on the support arm 108, support frame 414, hook frame 510, and so forth, may be acquired.

At 908, sensor data 112 from sensors 110 other than the weight sensors 110(1) is obtained. For example, capacitance data 112(2), photodetector data 112(6), proximity data 112(7) and so forth, may be acquired from the sensors 110 that have sensor FOVs 206 that include at least a portion of the hook 104 or the area proximate to the hook 104.

In another example, the sensor data 112 may include proximity data 112(7) obtained from the proximity sensor 110(15), such as an optical time-of-flight sensor. A first distance may be determined using the proximity sensor 110(15) at a first time. A second distance may be determined using the proximity sensor 110(15) at a second time.

At 910, at least a portion of the sensor data 112 is determined to exceed a threshold value. The sensor data 112 may be compared by the analysis module 122 to one or more thresholds specified in the threshold data 836. For example, the capacitance data 112(2) may change beyond a threshold percentage over a specified interval of time. In another example, the second distance of the proximity data 112(7) may be subtracted from the first distance to determine a change in distance.

At 912, event data 838 indicative of activity at the hook 104 is generated. Continuing the examples above, event data 838 may be generated based on the capacitance data 112(2) changing beyond a threshold percentage over a specified interval of time, the change in distance changing beyond a threshold distance value, and so forth.

In some implementations, the threshold data 836 may include information indicative of a duration or minimum interval of time. For example, a duration of the change in capacitance data 112(2) may need to exceed a minimum interval of time before an event is determined and corresponding event data 838 is generated.

At 914, a second set of weight data 112(1) is obtained from the one or more weight sensors 110(1) at a second time. In some implementations, acquisition of, or the selection of, the second set of weight data 112(1) may be responsive at least in part to the event data 838. For example, the acquisition of the second set of weight data 112(1) may be responsive to the change in distance exceeding the distance threshold.

At 916, weight change data is determined based on the first set of weight data 112(1) and the second set of weight data 112(1). For example, a second total weight calculated from the second set of weight data 112(1) may be subtracted from a first total weight calculated from the first set of weight data 112(1).

At 918, interaction data 126 associated with the hook 104 is determined based on one or more of the event data 838, the weight change data, or the item data 124. For example, the event data 838 may indicate the location of the event, such as at a particular hook 104, while the weight change data may be divided by the weight of an individual item 106 to determine a change in quantity of items 106 held by the hook 104. Based on whether the weight change data is a positive or negative number, a determination may be made as to whether the items 106 were added to or removed from the hook 104. The interaction data 126 may then be indicative of the location of the interaction, the item 106 involved, quantity involved, and so forth.

In some implementations, other techniques may be used to determine interaction data 126. For example, using the sensor data 112, a start of an activity associated with the hook 104 may be determined. Continuing the example, using the sensor data 112, an end of the activity associated with the hook 104 may be determined. Second weight data 112(1) or other sensor data 112 may be acquired using the one or more weight sensors 110(1). Interaction data 126 may then be generated. For example, a weight change value may be generated by subtracting the first set of weight data 112(1) from the second set of weight data 112(1). Based on this weight change value, interaction data 126 indicative of a quantity of items added or removed may be calculated.

In some implementations, one or more of the operations described above may be performed at the instrumented hook system 102, or by a computing device coupled thereto. For example, several instrumented hook systems 102 located at a particular rack may be connected to a computing device for data processing, communication with the network 702, and so forth. The computing device may use a communication interface to send the event data 838 and at least a portion of the sensor data 112 to an external device, such as the server 704.

Figure 10:
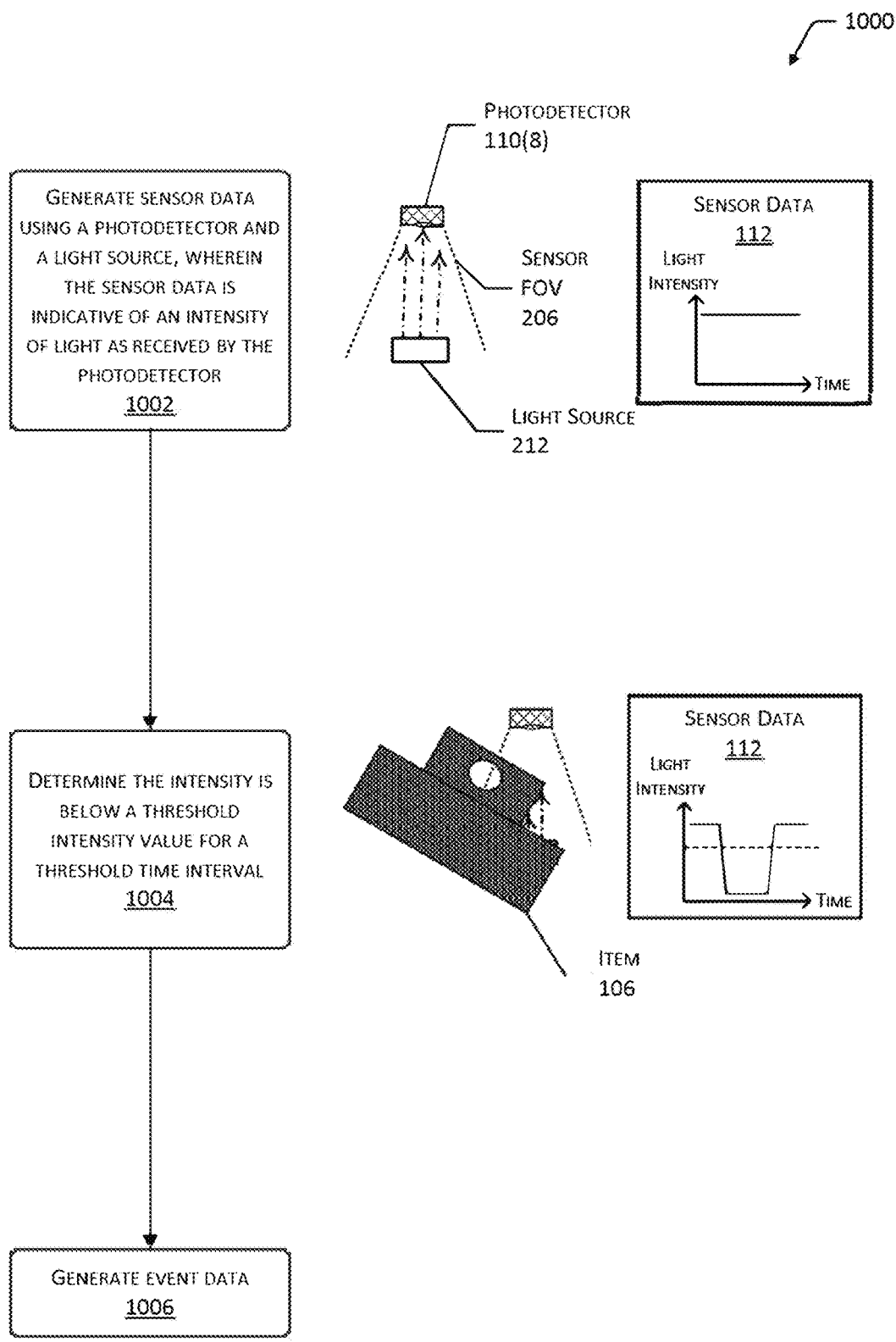
FIG. 10 depicts a flow diagram of a process for generating event data indicative of removal or addition of an item from a hook using a photodetector and light source, according to some implementations.

FIG. 10 depicts a flow diagram 1000 of a process for generating event data 838 indicative of a removal or addition of an item 106 from a hook 104 using a photodetector 110(8) and light source, according to some implementations. The process may be implemented at least in part by one or more of a computing device at the inventory location 612, by the server 704, or by another computing device.

At 1002, sensor data 112 such as the photodetector data 112(6) is generated using a photodetector 110(8) and a light source 212. The sensor data 112 may be indicative of the intensity of light as received by the photodetector 110(8). As described above with regard to FIG. 2, the light source 212 and the photodetector 110(8) may be arranged such that passage of a least a portion of the item 106 to or from the hook 104 results in at least partial occlusion of the emitted light.

At 1004, the intensity of the light as indicated by the sensor data 112 is determined to be below a threshold intensity value for a threshold time interval. For example, the thresholds may specify a drop in the intensity of more than 20% for a period of time of at least 50 milliseconds.

In other implementations, other analysis of the sensor data 112 may be performed. For example, machine learning techniques may be used to train an ANN or other pattern recognition system to recognize the changes in the photodetector data 112(6) and determine a count, whether items 106 have been added or removed, and so forth.

The light emitted from the photodetector 110(8) may be modulated. Such modulation may reduce interference from other lights sources, improve accuracy of the light intensity readings, and so forth.

At 1006, event data 838 is generated. Continuing the example, the event data 838 may indicate that a particular number of occlusions of light having the minimum duration specified by the threshold time interval occurred at a particular hook 104 associated with that pairing of a photodetector 110(8) and light source 212.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An apparatus comprising:
   an upright frame;
   a support arm mounted to the upright frame;
   a first weight sensor having a first end mounted to the support arm and a second end mounted to a hook suspension section of a hook;
   the hook suspended from the second end of the first weight sensor to measure a weight of a load on the hook, the hook suspension section of the hook within a center of mass tolerance distance above a center of mass of the hook; and
   a second sensor positioned above a tip of the hook to detect one or more of an object proximate to the hook, addition of an item to the hook, or removal of the item from the hook.

2. The apparatus of claim 1, wherein the hook suspension section of the hook is within the center of mass tolerance distance above the center of mass of the hook such that a torque applied to the second end of the first weight sensor remains within an operational specification of the first weight sensor.

3. The apparatus of claim 1, wherein the second sensor comprises an optical time-of-flight sensor including an optical transmitter and an optical receiver; and the apparatus further comprising:
   a memory storing computer-executable instructions; and
   a hardware processor to execute the computer-executable instructions to:
   determine first weight data using the first weight sensor at a first time;
   determine a first distance using the second sensor at the first time;
   determine a second distance using the second sensor at a second time;
   determine a change in distance by subtracting the second distance from the first distance;
   determine the change in distance exceeds a threshold value; and
   determine second weight data using the first weight sensor at a third time.

4. The apparatus of claim 1, further comprising:
   a light source to emit light proximate to the tip of the hook; and
   wherein the second sensor comprises a photodetector to detect at least a portion of the light emitted.

5. The apparatus of claim 1, wherein the second sensor comprises:
   a light source to emit light; and
   a photodetector to detect at least a portion of the light emitted as received proximate to the tip of the hook during one or more of the addition or the removal of the item from the hook.

6. The apparatus of claim 1, wherein the second sensor comprises a switch mounted proximate to the tip of the hook and arranged to one or more of make or break an electrical contact responsive to passage of the item along at least a portion of the hook.

7. The apparatus of claim 1, further comprising:
   a third sensor proximate to the tip of the hook to detect passage of the item along at least a portion of the hook; and one or more processors to generate sensor data using data from the first weight sensor, the second sensor, and the third sensor.

8. The apparatus of claim 1, further comprising:
a third sensor proximate to the tip of the hook; and
a wire harness, the wire harness to connect electronics within the support arm to the third sensor.

9. The apparatus of claim 1, further comprising an output device mounted to the support arm, the output device comprising one or more of:
an electrophoretic display,
a light emitting diode display,
a liquid crystal display, or
a microelectromechanical display; and
further wherein a field-of-view of the second sensor includes at least the tip of the hook.

10. An apparatus comprising:
a support arm;
a weight sensor mounted to the support arm;
a hook suspended from the weight sensor via a first section of the hook, the first section of the hook within a center of mass tolerance distance that is a horizontal distance above a center of mass of the hook;
a second sensor to detect one or more of an object or an item; and
electronics to generate sensor data from the weight sensor and the second sensor.

11. The apparatus of claim 10, further comprising:
a switch mounted proximate to a tip of the hook and arranged to one or more of make or break an electrical contact responsive to passage of the item along at least a portion of the hook; and
the electronics to generate the sensor data from the weight sensor, the second sensor, and the switch.

12. The apparatus of claim 10, further comprising:
a light source to emit light from a position on the hook proximate to a tip of the hook;
a photodetector mounted to the support arm between a tip of the support arm and the weight sensor; and
the electronics to generate at least a portion of the sensor data to be indicative of the light emitted from the light source as detected by the photodetector.

13. A system comprising:
a weight sensor;
a hook suspended from the weight sensor via a first section of the hook, the first section of the hook within a center of mass tolerance distance that is a horizontal distance above a center of mass of the hook;
a second sensor to detect one or more of an object or an item;
a memory storing computer-executable instructions; and
one or more hardware processors to execute the computer-executable instructions to:
acquire first data from the weight sensor; and
acquire second data from the second sensor.

14. The system of claim 13, the one or more hardware processors to further execute the computer-executable instructions to:
determine, using the second data, a start of an activity associated with the hook;
determine, using the second data, an end of the activity associated with the hook;
acquire third data using the weight sensor; and
generate a change value using the first data and the third data.

15. The system of claim 13, the one or more hardware processors to further execute the computer-executable instructions to:
determine at least a portion of the second data exceeds a threshold value for a minimum interval of time; and
acquire third data using the weight sensor.

16. The system of claim 13, further comprising a communication interface; and the one or more hardware processors to further execute the computer-executable instructions to:
determine at least a portion of the second data exceeds a threshold value;
generate event data indicative of occurrence of an event at the hook; and
send the event data and at least a portion of the first data to an external device using the communication interface.

17. The system of claim 13, further comprising:
an upright frame;
a support frame coupled to the upright frame, wherein the weight sensor is coupled to the support frame; and
a sensor arm coupled to the support frame, wherein the hook is suspended from the weight sensor via the sensor arm.

18. The system of claim 13, further comprising:
an upright frame;
a hook support frame coupled to the upright frame, wherein the weight sensor is coupled to the hook support frame;
a hook support coupled to the hook support frame, wherein the hook is suspended from the weight sensor via the hook support;
a face support frame coupled to the upright frame; and
a face piece coupled to the face support frame, the face piece comprising the second sensor.

19. The system of claim 13, further comprising:
a light source to emit light from a position on the hook proximate to a tip of the hook;
wherein the second sensor comprises a photodetector proximate to the tip of the hook; and
the one or more hardware processors to further execute the computer-executable instructions to:
determine the second data is indicative of a duration of time during which an intensity of the light emitted from the light source, as received by the photodetector, is below a threshold value; and
based on the second data, generate third data indicative of a change in quantity of items held by the hook.

20. The system of claim 13, wherein the horizontal distance is between a vertical line extending from a center point of the first section of the hook and a vertical line extending from a center of the center of mass of the hook.

* * * * *

UNITED STATES PATENT AND TRADEMARK OFFICE
CERTIFICATE OF CORRECTION

| | | |
|---|---|---|
| PATENT NO. | : 11,222,305 B1 | Page 1 of 1 |
| APPLICATION NO. | : 15/081435 | |
| DATED | : January 11, 2022 | |
| INVENTOR(S) | : Clayton et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 691 days.

Signed and Sealed this
Twenty-fifth Day of February, 2025

Coke Morgan Stewart
*Acting Director of the United States Patent and Trademark Office*